US011842557B2

(12) United States Patent
Kudo

(10) Patent No.: US 11,842,557 B2
(45) Date of Patent: Dec. 12, 2023

(54) ASSIGNMENT CONTROL APPARATUS, ASSIGNMENT CONTROL SYSTEM, AND ASSIGNMENT CONTROL METHOD

(71) Applicant: POSITIVE ONE CORPORATION, Tokyo (JP)

(72) Inventor: Shoichi Kudo, Tokyo (JP)

(73) Assignee: POSITIVE ONE CORPORATION, Tokyo (JP)

( * ) Notice: Subject to any disclaimer, the term of this patent is extended or adjusted under 35 U.S.C. 154(b) by 0 days.

(21) Appl. No.: 17/774,640

(22) PCT Filed: Nov. 8, 2020

(86) PCT No.: PCT/JP2020/041639
§ 371 (c)(1),
(2) Date: May 5, 2022

(87) PCT Pub. No.: WO2021/100502
PCT Pub. Date: May 27, 2021

(65) Prior Publication Data
US 2022/0392247 A1 Dec. 8, 2022

(30) Foreign Application Priority Data
Nov. 18, 2019 (JP) .................................. 2019-207572
Apr. 7, 2020 (JP) .................................. 2020-068708

(51) Int. Cl.
*G06K 9/00* (2022.01)
*G06V 40/10* (2022.01)
(Continued)

(52) U.S. Cl.
CPC .............. *G06V 40/103* (2022.01); *G06T 7/70* (2017.01); *G06V 10/12* (2022.01); *G06V 10/764* (2022.01);
(Continued)

(58) Field of Classification Search
CPC .............. G06T 7/70; G06T 2207/20081; G06T 2207/20084; G06T 2207/30196;
(Continued)

(56) References Cited

U.S. PATENT DOCUMENTS 7,724,962 B2 * 5/2010 Zhu ........................ G06V 20/58
382/225
10,839,230 B2 * 11/2020 Charette .............. G06V 10/454
(Continued)

FOREIGN PATENT DOCUMENTS

| CN | 104063150 A | 9/2014 |
| JP | 2005-322952 A | 11/2005 |

(Continued)

OTHER PUBLICATIONS

International Search Report dated Jan. 26, 2021, in corresponding to International Application No. PCT/JP2020/041639; 7 pages (with English Translation).

(Continued)

*Primary Examiner* — Eric Rush
(74) *Attorney, Agent, or Firm* — Maier & Maier, PLLC

(57) ABSTRACT

An assignment control apparatus includes an assignment device connected to multiple cameras and multiple specialized devices connected to the assignment device and each corresponding to one of preset multiple categories. The assignment device includes multiple determination units connected to the cameras one-to-one and each configured to determine the category of image data received from the camera to which the determination unit is connected, the category being one of the categories, and to output the image data along with category data indicating the determined category. The assignment device also includes an assignment unit configured to output the image data outputted from each specialized device to the specialized device (Continued)

corresponding to the category indicated by the category data outputted along with the image data.

2 Claims, 23 Drawing Sheets

(51) Int. Cl.
| | |
|---|---|
| *G06T 7/70* | (2017.01) |
| *G06V 20/52* | (2022.01) |
| *H04N 23/617* | (2023.01) |
| *G06V 10/94* | (2022.01) |
| *G06V 20/40* | (2022.01) |
| *G06V 10/12* | (2022.01) |
| *G08B 13/196* | (2006.01) |
| *G06V 10/764* | (2022.01) |
| *G08B 13/194* | (2006.01) |
| *G06V 10/96* | (2022.01) |
| *H04N 23/61* | (2023.01) |

(52) U.S. Cl.
CPC .............. *G06V 10/95* (2022.01); *G06V 10/96* (2022.01); *G06V 20/44* (2022.01); *G06V 20/52* (2022.01); *G08B 13/194* (2013.01); *G08B 13/19617* (2013.01); *G08B 13/19639* (2013.01); *H04N 23/61* (2023.01); *H04N 23/617* (2023.01); *G06T 2207/30196* (2013.01); *G06T 2207/30232* (2013.01)

(58) Field of Classification Search
CPC . G06T 2207/30221; G06T 2207/30232; G06T 2207/30236; G06T 2207/30242; G06T 2207/30248; G06T 2207/30252; G06T 2207/30256; G06T 2207/30261; G06V 10/12; G06V 10/40; G06V 10/70; G06V 10/74; G06V 10/764; G06V 10/82; G06V 10/94; G06V 10/95; G06V 10/955; G06V 10/96; G06V 20/10; G06V 20/17; G06V 20/40; G06V 20/41; G06V 20/44; G06V 20/46; G06V 20/50; G06V 20/52; G06V 20/53; G06V 20/54; G06V 20/58; G06V 40/10; G06V 40/103; G06V 40/16; G06V 40/161; G06V 40/178; G08B 13/18; G08B 13/189; G08B 13/194; G08B 13/196; G08B 13/19617; G08B 13/19634; G08B 13/19636; G08B 13/19639; G08B 13/19641; G08B 13/19643; G08B 13/19645; G08B 25/00; H04N 7/18; H04N 7/181; H04N 7/188; H04N 23/60; H04N 23/61; H04N 23/611; H04N 23/617; H04N 23/64; H04N 23/66; H04N 23/667
USPC ................ 382/100, 103–105, 110, 115, 141, 382/153–157, 159, 181, 190, 209, 217, 382/224–227, 239, 312, 318, 325; 348/77, 135, 143–145, 152, 153, 348/156–159, 222.1, 231.99, 231.3, 348/231.5, 231.6, 262; 706/12, 14, 16, 706/20, 25, 27, 28; 340/500, 501, 517, 340/521, 540, 541, 573.1, 573.3, 937, 944
See application file for complete search history.

(56) References Cited

U.S. PATENT DOCUMENTS

| | | | | |
|---|---|---|---|---|
| 10,878,219 | B2* | 12/2020 | Zhou | G06V 20/695 |
| 11,144,749 | B1* | 10/2021 | Lo | G06V 40/16 |
| 2008/0232682 | A1* | 9/2008 | Eswaran | G06F 18/2135 |
| | | | | 382/224 |
| 2015/0348411 | A1* | 12/2015 | Inoue | H04N 7/188 |
| | | | | 348/149 |
| 2017/0004380 | A1 | 1/2017 | Chen et al. | |
| 2017/0091953 | A1* | 3/2017 | Bleiweiss | G06V 20/52 |
| 2018/0190111 | A1* | 7/2018 | Green | G06V 20/52 |
| 2018/0285767 | A1* | 10/2018 | Chew | G06N 3/08 |
| 2018/0336415 | A1* | 11/2018 | Anorga | G06V 20/35 |
| 2019/0065897 | A1* | 2/2019 | Li | G06V 10/40 |
| 2020/0034615 | A1* | 1/2020 | Croxford | G06V 10/764 |
| 2022/0012514 | A1* | 1/2022 | Itoh | G06V 10/987 |

FOREIGN PATENT DOCUMENTS

| | | | |
|---|---|---|---|
| JP | 2006-085278 | A | 3/2006 |
| JP | 2010-272109 | A | 12/2010 |
| JP | 2011-164982 | A | 8/2011 |
| JP | 2015-001978 | A | 1/2015 |
| JP | 2015-135552 | A | 7/2015 |
| JP | 2017-091232 | A | 5/2017 |
| JP | 2017-224935 | A | 12/2017 |

OTHER PUBLICATIONS

Written Opinion dated Jan. 26, 2021, in corresponding to International Application No. PCT/JP2020/041639; 7 pages (with English Translation).

* cited by examiner

ASSIGNMENT CONTROL APPARATUS, ASSIGNMENT CONTROL SYSTEM, AND ASSIGNMENT CONTROL METHOD

TECHNICAL FIELD

The present invention relates to an assignment control apparatus, assignment control system, and assignment control method.

BACKGROUND

Systems have been known that use image data captured by cameras for monitoring or other purposes (see Patent Literatures 1 and 2). A security system described in Patent Literature 1 changes the operation camera in accordance with changes in the position of a moving object and displays image data captured by one camera on a monitor. A monitoring camera system described in Patent Literature 2 generates one continuous panorama image from image data captured by each of multiple cameras and displays the panorama image on a monitor. The image data captured by the cameras includes not only the installation environment of the cameras but also various information corresponding to the time zone, season, and the like and can be displayed for various applications, as well as can also be used for a variety of purposes other than display.

CITATION LIST

Patent Literature

[Patent Literature 1] Japanese Unexamined Patent Application Publication No. Hei 6-44470
[Patent Literature 2] Japanese Unexamined Patent Application Publication No. 2012-11989

SUMMARY

However, when the purpose of image data is changed in accordance with information included in the image data, the load on the processor or the like is significantly increased. Recently, the amount of image data captured by cameras has been increased, and an increasingly large amount of data has been communicated. Thus, the load on the processor has also been increased. When the 5th generation mobile communication system (5G) is widely used in the future, a larger amount of data than before will be communicated, resulting in a significant increase in the processing load on the processor. That is, changing the purpose of image data in accordance with information included in the image data in the conventional configuration will increase the load on the processor, leading to difficulty in smoothly performing processing. Further, when next-generation mobile communication systems such as the 6th generation mobile communication system (6G) and the 7th generation mobile communication system (7G) are sequentially realized, it would be difficult to perform various types of processing in the conventional configuration.

The present invention has been made to solve the above problems, and an object of the present invention is to provide an assignment control apparatus and assignment control system that reduce the load on the processor and allow image data to be smoothly used for a variety of purposes.

Solution to Problem

An assignment control apparatus according to one aspect of the present invention includes an assignment device connected to multiple cameras and multiple specialized devices connected to the assignment device and each corresponding to one of multiple preset categories. The assignment device includes multiple determination units connected to the cameras one-to-one and each configured to determine a category of image data received from the camera to which the determination unit is connected, the category being one of the categories, and to output the image data along with category data indicating the determined category and an assignment unit configured to output the image data outputted from each of the determination units to the specialized device corresponding to the category indicated by the category data outputted along with the image data.

An assignment control apparatus according to one aspect of the present invention includes an assignment device connected to a camera, multiple specialized devices connected to the assignment device and each corresponding to one of multiple preset categories, an attribute assignment unit connected to the specialized devices, and multiple attribute units connected to the attribute assignment unit and each corresponding to one of multiple attributes. The assignment device includes a determination unit connected to the camera and configured to determine a category of image data received from the camera, the category being one of the categories, and to output the image data along with category data indicating the determined category and an assignment unit configured to output the image data outputted from the determination unit to the specialized device corresponding to the category indicated by the category data outputted along with the image data. The specialized device determines an attribute of the image data outputted from the assignment unit, the attribute being one of the attributes of the category determined by the determination unit that has outputted the image data, and outputs attribute data indicating the determined attribute to the attribute assignment unit. The attribute assignment unit outputs the attribute data outputted from each of the specialized devices to the attribute unit corresponding to the attribute indicated by the attribute data. The attribute unit performs a process corresponding to the attribute data outputted from the attribute assignment unit.

An assignment control system according to one aspect of the present invention includes the above assignment control apparatus and an update device. The specialized devices each have an analysis program related to determination of the attribute and transmits the image data and analysis information including the determined attribute to the update device. The update device updates the analysis programs of the specialized devices on the basis of the image data and the analysis information transmitted from the specialized devices and transmits the updated analysis programs to the specialized devices.

An assignment control apparatus according to one aspect of the present invention includes an assignment device connected to a camera and multiple specialized devices connected to the assignment device and each corresponding to one of multiple preset categories. The assignment device includes a determination unit connected to the camera and configured to determine a type of a main object included in image data received from the camera as the category of the image data and to output the image data along with category data indicating the determined category and an assignment unit configured to output the image data outputted from the determination unit to the specialized device corresponding to the category indicated by the category data outputted along with the image data.

An assignment control apparatus according to one aspect of the present invention includes an assignment device connected to a camera and multiple specialized devices connected to the assignment device and each corresponding to one of multiple preset categories. The assignment device includes a determination unit connected to the camera and configured to determine a main age group of persons included in image data received from the camera as the category of the image data and to output the image data along with category data indicating the determined category and an assignment unit configured to output the image data outputted from the determination unit to the specialized device corresponding to the category indicated by the category data outputted along with the image data.

According to an assignment control apparatus according to one aspect of the present invention, in the above assignment control apparatus, the specialized devices determines an attribute of the image data outputted from the assignment unit, the attribute being one of the attributes of the category determined by the determination unit that has outputted the image data, and performs a process corresponding to the determined attribute. An assignment control system according to one aspect of the present invention includes the above assignment control apparatus and a display device. The specialized device causes the display device to display a video or a still image corresponding to the determined attribute.

An assignment control method according to one aspect of the present invention includes determining, by each of multiple determination units connected to multiple cameras one-to-one, a category of image data received from the camera to which the determination unit is connected, the category being one of multiple preset categories, outputting, by the determination unit, the image data along with category data indicating the determined category, and outputting, by an assignment unit connected to multiple specialized devices that each correspond to one of the categories, the image data outputted from each of the determination units to the specialized device corresponding to the category indicated by the category data outputted along with the image data.

An assignment control method according to one aspect of the present invention includes determining, by a determination unit connected to a camera, a type of a main object included in image data received from the camera as a category of the image data, outputting, by the determination unit, the image data along with category data indicating the determined category, and outputting, by an assignment unit connected to multiple specialized devices that each correspond to one of the categories, the image data outputted from the determination unit to the specialized device corresponding to the category indicated by the category data outputted along with the image data.

According to the present invention, the determination units connected to the cameras each determine the category of the image data, and the assignment unit outputs the image data to the specialized device corresponding to the category. Thus, the present invention distributes the load to the determination units and specialized devices and thus reduces the load on each processor and allows the image data to be smoothly used for a variety of applications.

BRIEF DESCRIPTION OF DRAWINGS

FIG. 14 is a drawing showing an example in which the assignment control system of FIG. 13 is applied to an intersection on a street, or the like.

DETAILED DESCRIPTION

First Embodiment

Figure 1:
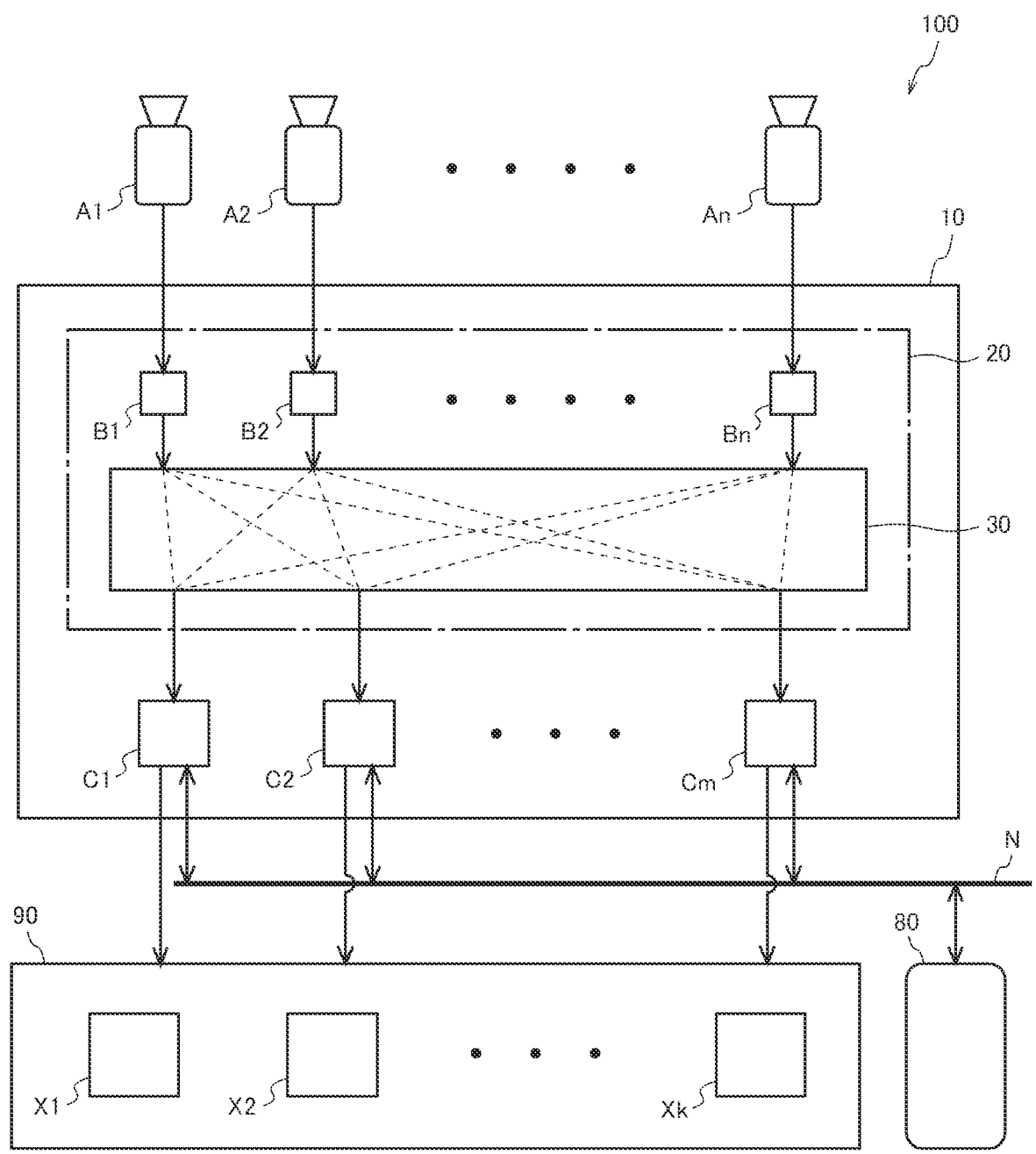
FIG. 1 is a block diagram showing an example configuration of an assignment control apparatus and assignment control system according to a first embodiment of the present invention.

Referring to FIG. 1, the configuration of an assignment control apparatus and assignment control system according to a first embodiment will be described. An assignment control system 100 includes multiple cameras A1 to An (n is a natural number of 2 or more), an assignment control apparatus 10, and an actuator unit 90. The actuator unit 90 consists of multiple actuators X1 to Xk (k is a natural number of 2 or more) controlled by the assignment control apparatus 10. The cameras A1 to An are collectively referred to as the "cameras A." The actuators X1 to Xk are collectively referred to as the "actuators X."

The cameras A each include an image sensor such as a charge coupled device (CCD) or complementary metal oxide semiconductor (CMOS). The cameras A capture videos, still images, or the like and output the captured video or the like to the assignment control apparatus 10 as image data. In the first embodiment, the cameras A also output identification information representing themselves to the assignment control apparatus 10.

The actuators X are devices that operate on the basis of electrical signals outputted from the assignment control apparatus 10. Conceivable examples of the actuators X include light-emitting means including a light source such as a light-emitting diode (LED), notification means including a speaker, and drive means such as a motor.

The assignment control apparatus 10 includes an assignment device 20 connected to the cameras A1 to An and multiple specialized devices C1 to Cm (m is a natural number of 2 or more) that each correspond to one of preset multiple categories. The specialized devices C1 to Cm are connected to the assignment device 20. The specialized devices C1 to Cm are collectively referred to as the "specialized devices C."

The assignment device 20 includes multiple determination units B1 to Bn connected to the cameras A1 to An one-to-one. The determination units B1 to Bn each determine the category of image data received from the camera A to which the determination unit is connected, which is one of the above categories, and generate category data indicating the determined category. The determination units B1 to Bn then output the image data whose category has been determined to the assignment device 20 along with the category data. The determination units B1 to Bn are collectively referred to as the "determination units B."

The determination unit B each include artificial intelligence (AI) based on learning such as deep learning and determines the category of image data by estimating a main object included in the image data. As with specialized devices C (to be discussed later), the determination unit B each include a communication unit, a storage unit, and a controller, which are not shown. The controller consists of, for example, a central processing unit (CPU) or graphics processing unit (GPU). The determination units B are lower in throughput than the specialized devices C and therefore can each consist of a member having lower performance than the specialized devices C.

The assignment device 20 includes an assignment unit 30 that outputs the image data outputted from the determination units B1 to Bn to the specialized devices C corresponding to the categories indicated by the category data outputted along with the image data. As shown by broken lines in FIG. 1, the assignment unit 30 has m routes (options) through which it assigns data received from each determination unit B to one of the specialized devices C1 to Cm. That is, the assignment unit 30 has n×m routes (options) through which it assigns data received from each of the determination units B1 to Bn to one of the specialized devices C1 to Cm. The assignment unit 30 consists of a programmable logic device such as a field-programmable gate array (FPGA). The assignment program of the assignment unit 30, which is a logic program, can be changed as appropriate in accordance with the use case As used herein, the term "category" refers to the category of a main object included in image data. Examples of the main object include non-moving objects such as an electric wire and a utility pole and moving objects such as a vehicle and a flying object. For example, dimensions such as "person" and "dog" may be set as categories. Also, for example, concepts such as "age group" and "motion state" with respect to each person may be set as categories. Multiple attributes are previously set with respect to each category so that the category is segmented. For example, attributes such as pigeon, crow, and bat are set with respect to a category "bird."

Each specialized device C performs image analysis specialized in one of the categories. More specifically, each specialized device C includes AI based on learning such as deep learning and estimates the attribute of the category of a main object included in image data, which is one of the attributes of the category in which the specialized device C specializes.

Specifically, each specialized device determines the attribute of image data outputted from the assignment unit 30. This attribute is one of the attributes of the category determined by the determination unit that has outputted the image data. The specialized device then performs a process corresponding to the determined attribute. Details of the process corresponding to the attribute performed by the specialized device C are previously set in association with the attribute in the operation program or the like of the specialized device C and can be changed as necessary. For example, the specialized device C outputs control signals corresponding to the determined attribute to one or more actuators X.

Figure 2:
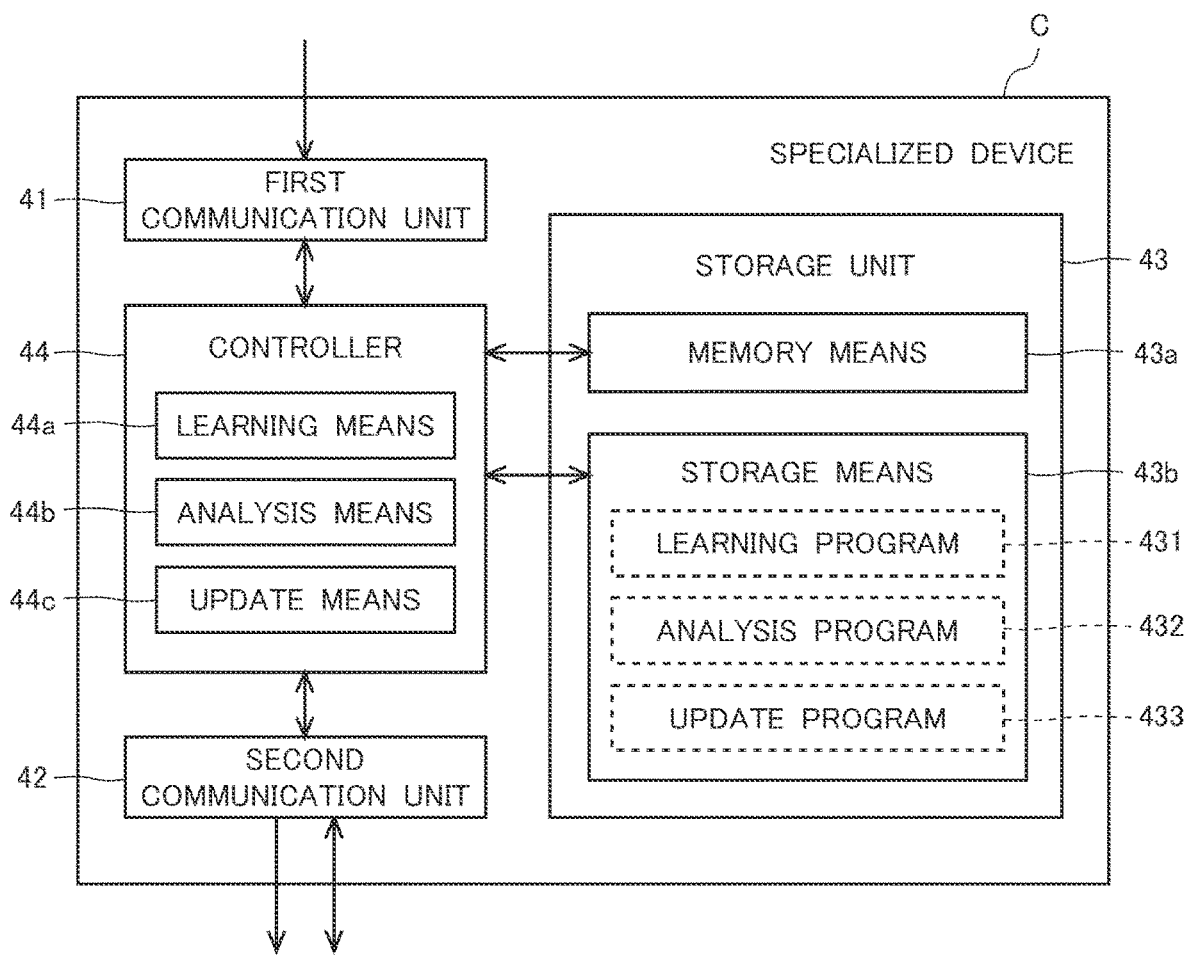
FIG. 2 is a block diagram showing an example of the functional components of each specialized device in FIG. 1.

Referring to FIG. 2, a specific example configuration of each specialized device C will be described below. As shown in FIG. 2, each specialized device C includes a first communication unit 41, a second communication unit 42, a storage unit 43, and a controller 44. The first communication unit 41 is an interface that receives data outputted from the assignment unit 30 and transfers it to the controller 44. The second communication unit 42 is an interface used by the controller 44 to communicate with the actuator unit 90, a device connected to the network N, or a wirelessly connected device.

The storage unit 43 includes memory means 43a and storage means 43b. The memory means 43a is a volatile storage device that consists of, for example, a random access memory (RAM) and temporarily stores data. The storage means 43b consists of a flash memory, embedded multimedia card (eMMC), solid state drive (SSD), or the like. FIG. 2 shows a learning program 431, an analysis program 432, and an update program 433 as example operation programs of the specialized device C. The analysis program 432 is a program for performing a process related to the determination of the attribute.

The controller 44 includes learning means 44a, analysis means 44b, and update means 44c. In other words, the controller 44 serves as the learning means 44a by reading the learning program 431, serves as the analysis means 44b by reading the analysis program 432, and serves as the update means 44c by reading the update program 433. The controller 44 consists of a system-on-a-chip (SoC) including a CPU, GPU, or the like.

The learning means 44a generates the analysis program 432 by performing learning such as deep learning using learning data. The analysis means 44b determines the attribute of image data outputted from the assignment unit 30. This attribute is one of the attributes of the category of the image data determined by the determination unit B that has outputted the image data. The analysis means 44b then performs a process corresponding to the determined attribute and outputs the image data and analysis information including the determined attribute to an update processor 80 through the second communication unit 42. In the first embodiment, the analysis means 44b stores the image data received from the assignment unit 30 and the analysis information in the storage means 43b.

The update means 44c updates the analysis program 432 by performing learning on the basis of the image data and analysis information stored in the storage means 43b. The update means 44c also updates the analysis program 432 in the storage means 43b on the basis of the analysis program 432 updated and transmitted by the update processor 80. Note that the update means 44c may perform only one of the analysis program 432 update process based on its own learning and the analysis program 432 update process in cooperation with the update processor 80.

In the first embodiment, the specialized devices C1 to Cm are connected to the update processor 80 through the network N such as the internet. The update processor 80 is, for example, a cloud server based on cloud computing. The specialized devices C1 to Cm each transmit image data received from the assignment unit 30 and analysis information to the update processor 80.

The update processor 80 is storing the analysis programs 432 of the specialized devices C. The update processor 80 has a function of updating the analysis programs 432 by performing learning on the basis of the image data and analysis information transmitted from the specialized devices C. The update processor 80 updates the analysis programs 432 every predetermined time, or when the amount of stored data reaches a predetermined amount, or at any other timing. The update processor 80 also transmits the updated analysis programs 432 to the specialized devices C at a preset timing. Thus, the specialized devices C are able to update the analysis programs 432. The update processor 80 is not limited to a cloud server and may be a physical server such as a Web server. The update processor 80 may also be a desktop personal computer (PC), notebook PC, tablet PC, or the like. The specialized devices C and update processor 80 may communicate with each other by wire, wirelessly, or both.

As seen above, the update processor 80 updates the analysis programs 432 of the specialized devices C on the basis of the image data and analysis information transmitted from the specialized devices C and transmits the updated analysis programs 432 to the specialized devices C. Thus, the specialized devices C are able to update the analysis programs 432 in the storage unit 43 on the basis of the analysis programs 432 updated and transmitted by the update processor 80.

Figure 3:
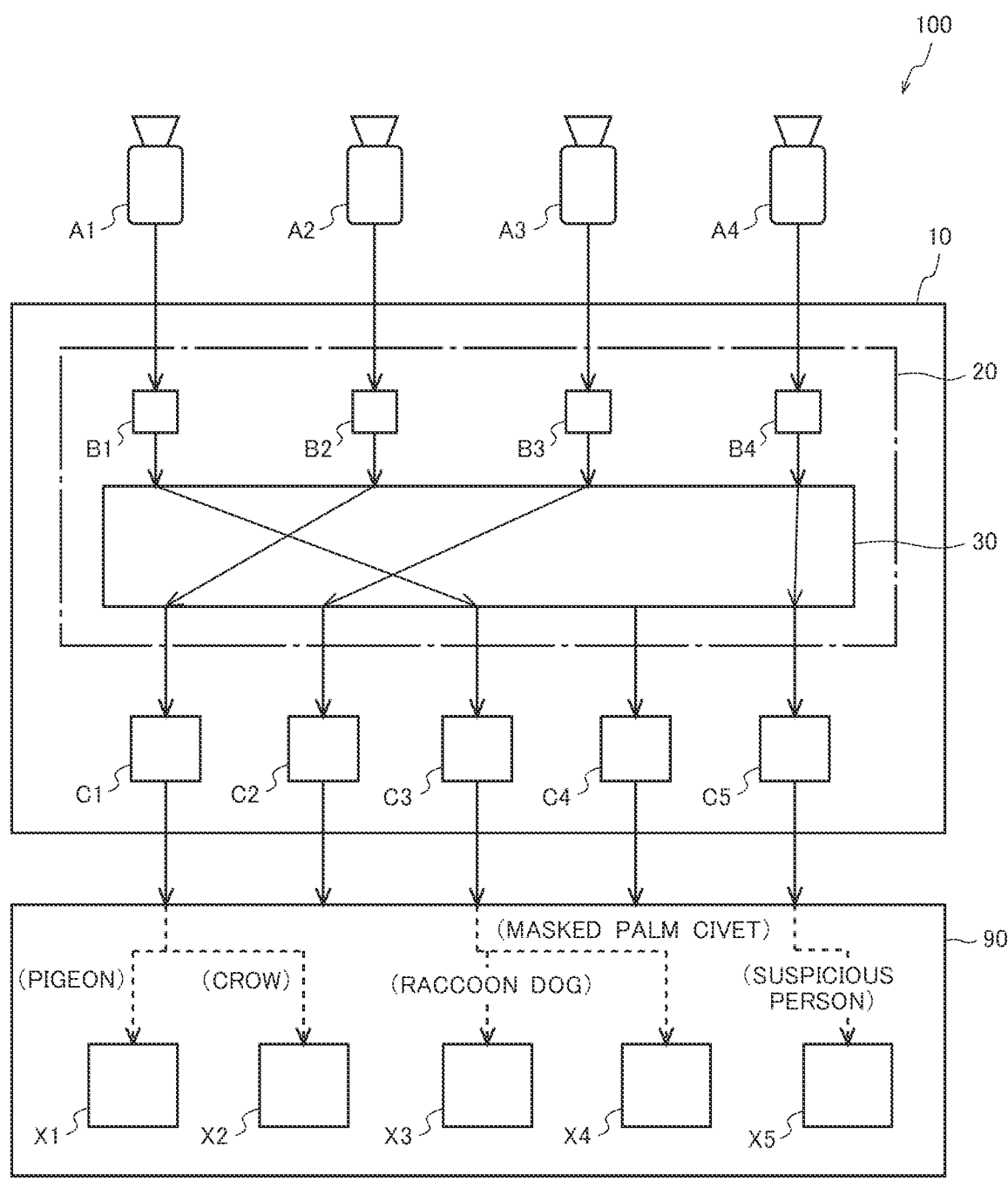
FIG. 3 is a block diagram showing an example application of the assignment control system of FIG. 1.

Next, referring to FIG. 3, an example application of the assignment control system 100 will be described. An example will be described below in which the assignment control system 100 is applied to the monitoring and management of a paddy field or field. FIG. 3 shows an example in which the assignment control system 100 includes four cameras A, the assignment control apparatus 10 includes four determination units B and five specialized devices C, and the actuator unit 90 includes five actuators X.

It is assumed that the specialized device C1 and C2 correspond to the category "bird", the specialized devices C3 and C4 correspond to a category "terrestrial animal", and the specialized device C5 corresponds to a category "person." It is also assumed that the actuator X1 is light-emitting means that emits light, the actuators X2 and X3 are notification means that emit a sound disliked by animals, the actuator X4 is sound wave emitting means that emits ultrasound, and the actuator X5 is notification means that emits a warning sound or voice.

FIG. 3 shows an example in which the determination unit B1 determines that the category of image data from the camera A1 is "terrestrial animal," the determination unit B2 determines that the category of image data from the camera A2 is "bird," the determination unit B3 determines that the category of image data from the camera A3 is "bird," and the determination unit B4 determines that the category of image data from the camera A4 is "person."

In this example, the specialized device C1 determines the attribute of the category "bird" of the image data received from the assignment unit 30. As an example, if the specialized device C1 determines that the attribute of the image data is "pigeon," it outputs, to the actuator X1, a control signal instructing the actuator X1 to emit light. If the specialized device C1 determines that the attribute of the image data is "crow," it outputs, to at least one of the actuators X2 and X3, a control signal instructing the actuator (s) to emit a warning sound. In this case, for example, the specialized device C1 may grasp the position of the camera A2 from the identification information of the camera A2 and output a control signal to an actuator closer to the camera A of the actuators X2 and X3.

The specialized device C3 determines the attribute of the category "terrestrial animal" of the image data received from the assignment unit 30. As an example, if the specialized device C3 determines that the attribute of the image data is "raccoon dog," it outputs, to the actuator X2 or X3, a control signal instructing the actuator to emit a cry of a wolf or the like. Similarly, if the specialized device C3 determines that the attribute of the image data is "masked palm civet," it outputs, to the actuator X4, a control signal instructing the actuator X4 to emit ultrasound.

The specialized device C5 determines the attribute of the category "person" of the image data received from the assignment unit 30. As an example, if the specialized device C3 determines that the attribute of the image data is "suspicious person," it outputs, to the actuator X5, a control signal instructing the actuator X5 to output a warning sound or voice. The specialized devices C2 and C4 also perform a similar process.

The above processes performed by the specialized devices C are illustrative only and do not represent the most suitable examples. Also, the actuator unit 90 may include an actuator X other than those described above, such as odor emitting means that emits a particular odor or air blowing means that blows air to the target. That is, the processes performed by the specialized devices C and the actuators X can be changed as necessary. Also, each specialized device C may simultaneously operate multiple actuators X, for example, the actuator X1 and actuator X2, by outputting control signals to those actuators X.

The assignment control system 100 may cause the update processor 80 to learn the reaction of a moving object to the operation of the actuators X, or the like on the basis of the image data or the analysis information generated by the specialized devices C. The assignment control system 100 then may upload the analysis programs 432 of the specialized devices C using the update processor 80 so that the specialized devices C select the most suitable repelling method.

Figure 4:
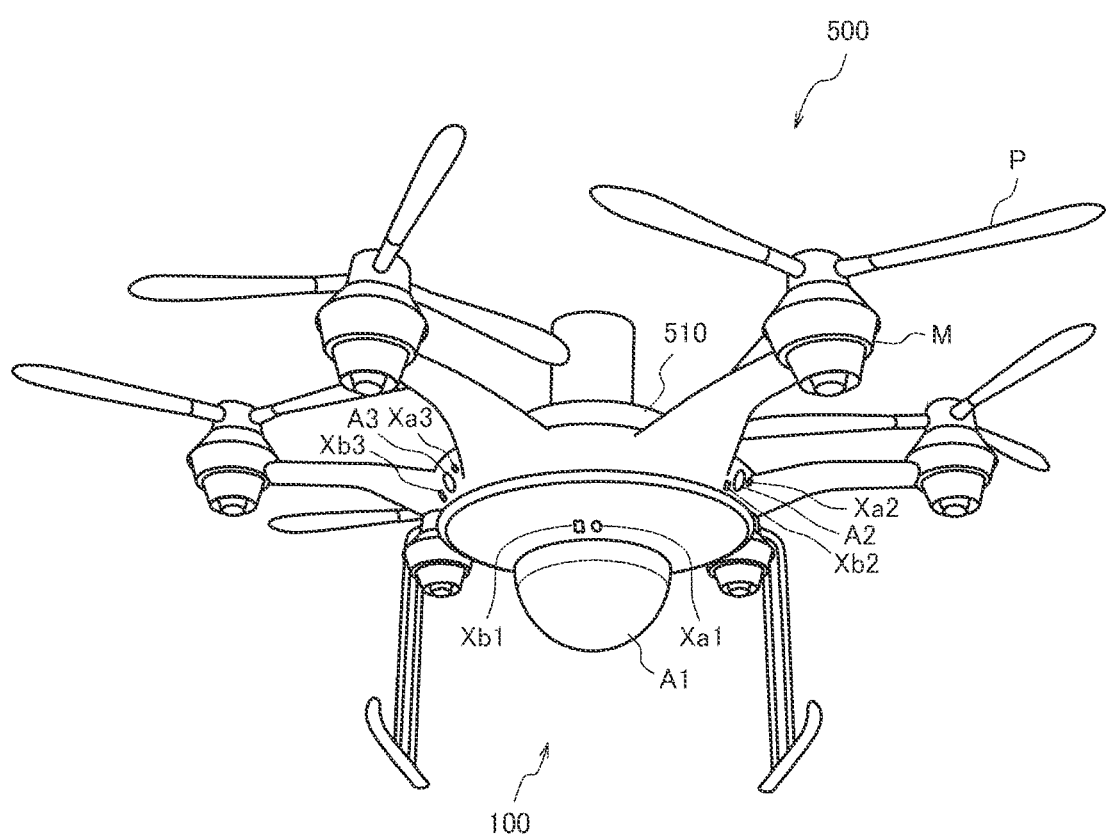
FIG. 4 is an external view showing an example of a flying object including the assignment control system of FIG. 1.
Figure 5:
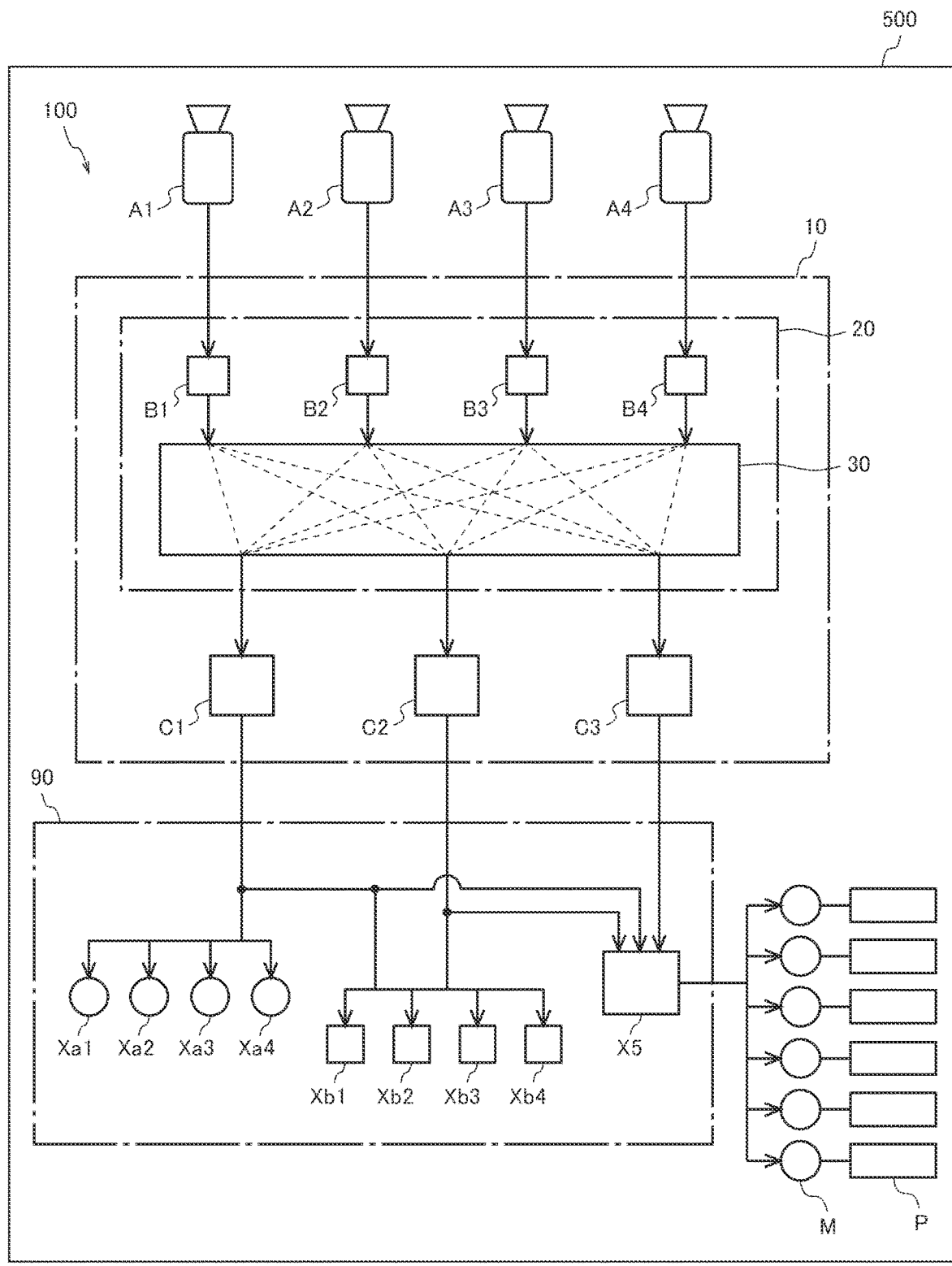
FIG. 5 is a block diagram showing an example in which the assignment control system of FIG. 1 is included in the flying object.

Next, referring to FIGS. 4 and 5, an example will be described below in which the assignment control system 100 is applied to a flying object. FIGS. 4 and 5 show a drone in which a body 510 is provided with six propellers P, as an example of a flying object 500. In this example, the assignment control system 100 includes four cameras A, the assignment control apparatus 10 includes four determination units B and three specialized devices C, and the actuator unit 90 includes nine actuators X.

It is assumed that the specialized device C1 corresponds to the category "bird," the specialized device C2 corresponds to the category "person," and the specialized device C3 corresponds to a category "obstacle." It is also assumed that actuators Xa1 to Xa4 are light-emitting means that emit light, actuators Xb1 to Xb4 are notification means that emit a sound or voice, and an actuator X5 is drive means that controls the operation of a motor M. For convenience, it is assumed that the actuators Xb1 to Xb4 have a function of emitting ultrasound. Note that in FIG. 5, a power supply, sensors, and the like are omitted.

In the example of FIG. 5, the specialized device C1 is connected to the actuators Xa1 to Xa4, actuators Xb1 to Xb4, and actuator X5. The specialized device C2 is connected to the actuators Xb1 to Xb4 and the actuator X5. The specialized device C3 is connected to the actuator X5.

It is assumed that the specialized device B1 determines that the category of image data from the camera A1 is "bird" and outputs category data indicating the category "bird" to the assignment unit 30. In this case, the assignment unit 30 outputs the image data to the specialized device C1 on the basis of the category data from the determination unit B1. The specialized device C1 determines the attribute of the image data from among pigeon, crow, bat, and the like. For example, if the specialized device C1 determines that the attribute of the image data is "bat," it grasps the position of the camera A1 from the identification information of the camera A1, selects the actuator Xb1, which is notification means closest to the camera A1, and outputs, to the selected actuator Xb1, a control signal instructing the actuator Xb1 to emit ultrasound.

It is also assumed that the specialized device B2 determines that the category of image data from the camera A2 is "obstacle" and outputs category data indicating the category "obstacle" to the assignment unit 30. In this case, the assignment unit 30 outputs the image data to the specialized device C3 on the basis of category data from the determination unit B2. The specialized device C3 determines the attribute of the image data from among an electric wire, a utility pole, and the like. Then, for example, the specialized device C3 obtains the distance from the obstacle by analyzing the image data and outputs a control signal to avoid the obstacle, to the actuator X5 on the basis of the obtained distance, the speed of the flying object 500, and the like as necessary. Thus, a situation in which the flying object 500 will collides with the obstacle can be avoided.

It is also assumed that the specialized device B3 determines that the category of image data from the camera A3 is "person" and outputs category data indicating the category "person" to the assignment unit 30. In this case, the assignment unit 30 outputs the image data to the specialized device C2 on the basis of the category data from the determination unit B3. The specialized device C2 determines the attribute of the image data from among "soccer," "baseball," "kite-flying," and the like. Then, for example, the specialized device C2 analyzes the movement of a ball or the like included in the image data, grasps the position of the camera A3 from the identification information of the camera A3, selects the actuator Xb3, which is notification means closest to the camera A3, and then outputs, to the selected actuator Xb3, a control signal instructing the actuator Xb3 to output an attention calling voice or the like as necessary.

It is also assumed that the determination unit B4 determines that the category of image data from the camera A3 is "bird" and outputs category data indicating the category "bird" to the assignment unit 30. In this case, the assignment unit 30 outputs the image data to the specialized device C1 on the basis of the category data from the determination unit B4, and the specialized device C1 determines the attribute of the image data. For example, if the specialized device C1 determines that the attribute of the image data is "pigeon," it grasps the position of the camera A4 from the identification information of the camera A4, selects the actuator Xb4, which is notification means closest to the camera A4, and outputs, to the selected actuator Xb4, a control signal instructing the actuator Xb4 to emit light.

Figure 6:
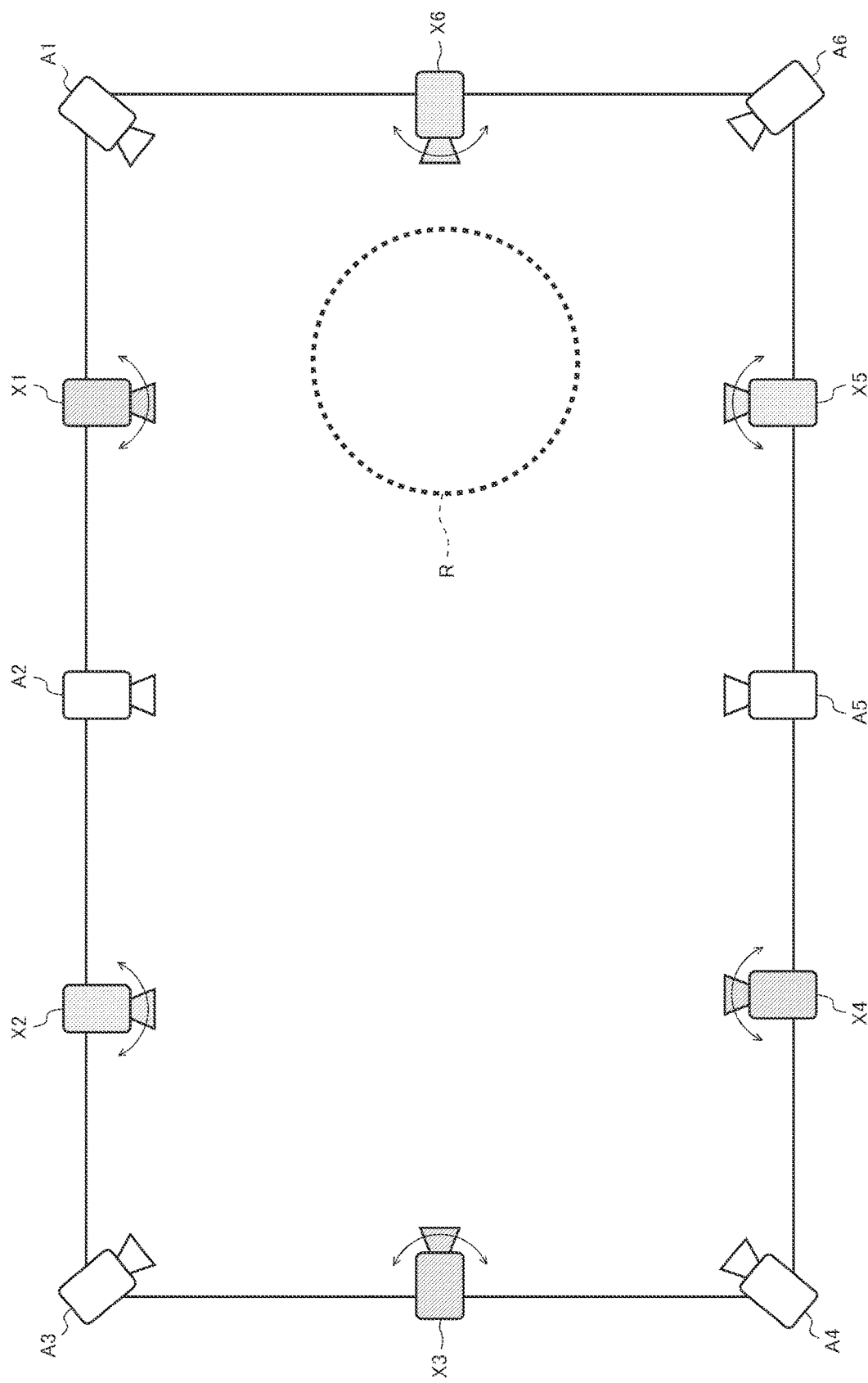
FIG. 6 is a diagram showing an example in which the assignment control system of FIG. 1 is applied to a facility such as a stadium.

Next, referring to FIGS. 6 and 7, an example will be described below in which the assignment control system 100 is applied to a facility such as a stadium. FIG. 6 shows an example in which the assignment control system 100 includes six cameras A, the assignment control apparatus 10 includes six determination units B and six specialized devices C, and the actuator unit 90 includes six actuators X. It is assumed that the cameras A1 to A6 are fixed-point cameras and the actuators X1 to X6 are movable cameras that generate image data by capturing videos, still images, or the like.

It is also assumed that the specialized devices C1 to C3 correspond to a category "ball" and the specialized devices C4 to C6 correspond to the category "person." Each specialized device C controls the operation of one or more actuators X on the basis of the analysis results of image data. The specialized devices C1 to C3 determine the position, movement, or the like of a ball as the attribute of image data by analyzing the image data. The specialized devices C1 to C3 then select one or more actuators X to be controlled, on the basis of the position, movement, or the like of the ball included in the image data. Then, for example, the specialized devices C1 to C3 generate control signals instructing the selected one or more actuators X to operate in accordance with the movement of the ball and output the control signals to those actuators.

The specialized devices C4 to C6 determine that the number, position, movement, or the like of persons as the attribute of image data by analyzing the image data. The specialized devices C4 to C6 then select one or more actuators X to be controlled, on the basis of the number, position, movement, or the like of persons included in the image data. For example, the specialized devices C4 to C6 determine, as the attribute of the category "person," "congestion" indicating a state in which persons are gathering, "fall" indicating a state in which a person is falling, "spot" indicating a particular person such as an ace, "warning" indicating a situation in which a referee is holding a card, or the like. Such an attribute is preferably set for each sport or event.

Each specialized device C may select one or more actuators X using the identification information of the camera A. For example, it is assumed that a ball is present in a region R of FIG. 6, image data captured by the camera A1 is outputted to the specialized device C1 through the determination unit B1 and assignment unit 30, and image data captured by the camera A6 is outputted to the specialized device C2 through the determination unit B6 and assignment unit 30 (see broken-line arrows in FIG. 7). It is also assumed that the actuators X1, X2, and X3 are associated with the camera A1 and the actuators X4, X5, and X6 are associated with the camera A6. In this case, the specialized device C1 may select at least one of the actuators X1, X2, and X3 on the basis of the identification information of the camera A1. Similarly, the specialized device C2 may select at least one of the actuators X4, X5, and X6 on the basis of the identification information of the camera A6.

The actuator controlled by each specialized device C may be changed depending on the situation by causing multiple specialized devices C to cooperate with each other. One of the specialized devices C may have a function of centrally controlling selection of an actuator(s) X. Or, a processor for centrally controlling selection of an actuator(s) X may be provided separately from the specialized devices C. Or, one or more actuators X may be previously associated with each camera A and, when multiple control signals are simultaneously outputted to one actuator X, the actuator X may determine details of operation on the basis of one or more of the control signals. Specifically, in the example of FIG. 6, it is assumed that the actuators X6 and X1 are associated with the camera A1, the actuators X1 and X2 are associated with the camera A2, the actuators X2 and X3 are associated with the camera A3, the actuators X3 and X4 are associated with the camera A4, the actuators X4 and X5 are associated with the camera A5, and the actuators X5 and X6 are associated with the camera A6. In a situation shown by broken-line arrows in FIG. 7, both the specialized device C1 and specialized device C2 output control signals to the actuator X6. In this case, the actuator X6 may select one of the control signal of the specialized device C1 and the control signal of the specialized device C2 on the basis of predetermined priority or the like and operate. Or, the actuator X6 may operate on the basis of both the control signal of the specialized device C1 and the control signal of the specialized device C2, that is, may determine the degree of operation by performing predetermined arithmetic processing on the control signals.

Figure 7:
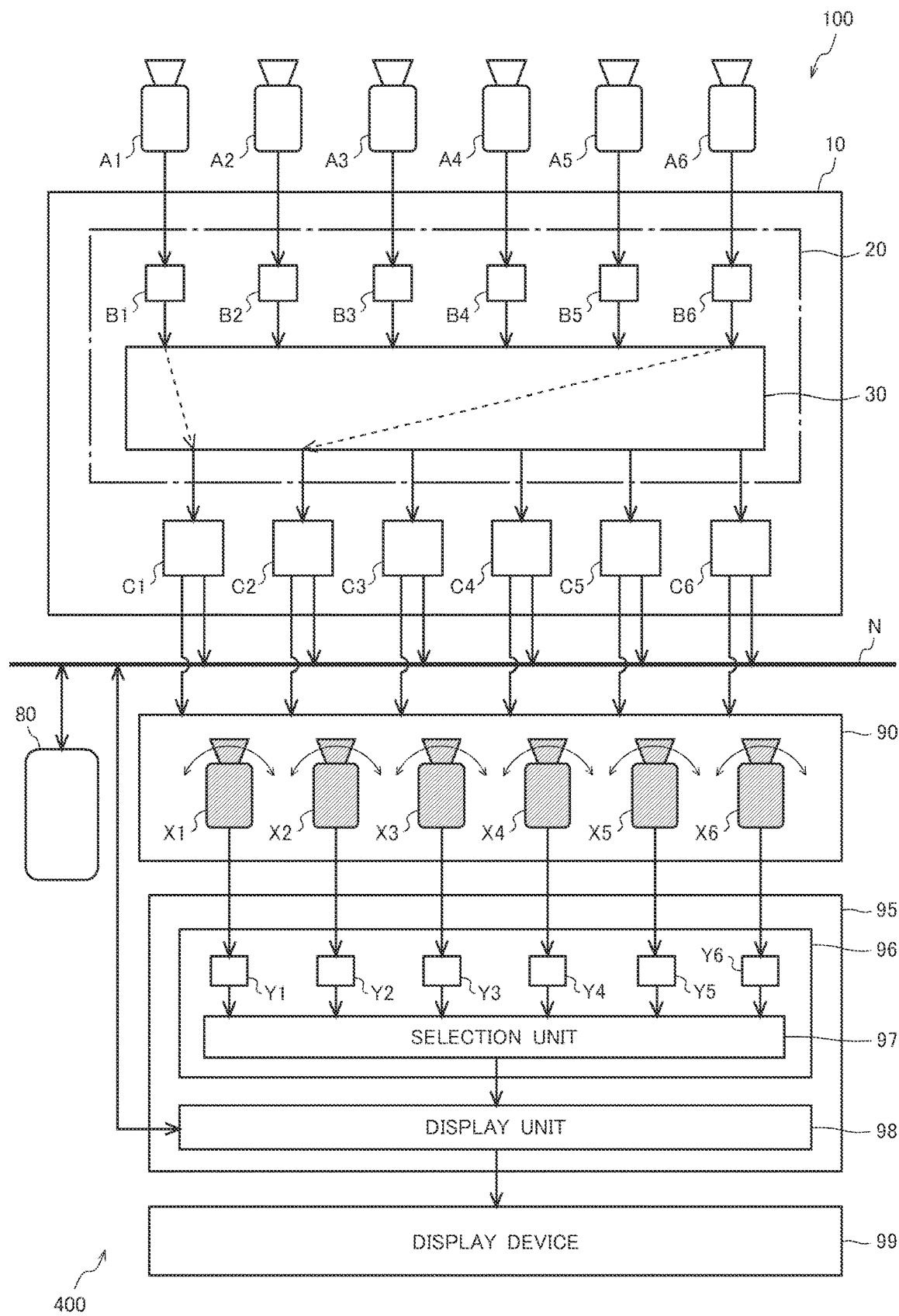
FIG. 7 is a block diagram showing the assignment control system of FIG. 1 associated with the situation of FIG. 6.

In the configuration of FIG. 7, the assignment control system 100 forms an image display system 400 with the cameras A1 to A6, the actuator unit 90, a display control device 95, and a display device 99. The display control device 95 includes a selector 96 and a display unit 98. The selector 96 analyzes image data outputted from the actuators X1 to X6 and selects image data to be displayed on the display device 99. The selector 96 includes analysis processors Y1 to Y6 connected to the actuators X1 to X6 one-to-one and a selection unit 97 connected to the analysis processors Y1 to Y6. The analysis processors Y1 to Y6 are collectively referred to as the "analysis processors Y."

The analysis processors Y analyze the image data outputted from the actuators X and obtain evaluation indexes indicating the importance of the corresponding image data. The analysis processors Y then output the analyzed image data to the selection unit 97 together with the obtained evaluation indexes. As with the above-mentioned specialized devices C, the analysis processors Y each include a communication unit, a storage unit, and a controller, which are not shown. The controller consists of, for example, a CPU or GPU. An algorithm for computing the evaluation index may be selectively determined by the analysis processors Y in accordance with details of the image data, or may be previously set in accordance with a sport performed in the facility.

The selection unit 97 selects one or more pieces of image data on the basis of the evaluation indexes outputted from the analysis processors Y and outputs the selected image data to the display unit 98. Specifically, in a one-screen setting in which one screen is displayed on the display of the display device 99, the selection unit 97 selects one piece of image data; in a multi-screen setting in which multiple screens are displayed on the display of the display device 99, the selection unit 97 selects multiple pieces of image data.

The display unit 98 displays images on the display device 99 on the basis of the one or more pieces of image data outputted from the selection unit 97. Since a priority is determined for each screen in the multi-screen setting, the display unit 98 sequentially assigns pieces of image data having higher evaluation indexes to screens having higher priorities. Note that in a predetermined situation such as a scene in which a person or ball does not move, the display unit 98 may acquire the image data of the cameras A from the specialized devices C through the network N and change images to be display on the display device 99 to the images of the cameras A. The display device 99 consists of, for example, a liquid crystal display and displays various images on the display unit.

Figure 8:
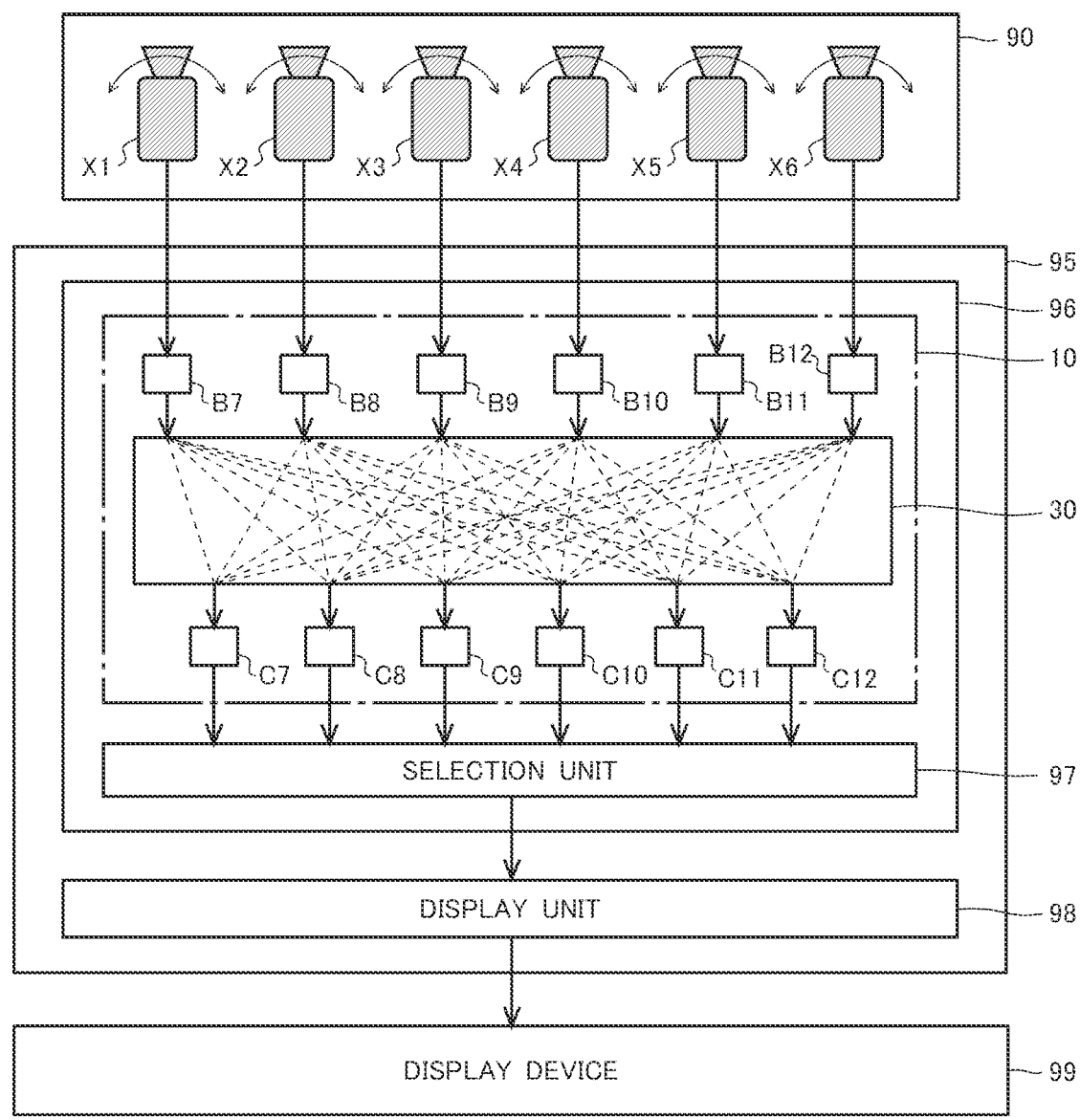
FIG. 8 is a block diagram showing an example configuration in which the assignment control apparatus of FIG. 1 is applied to the selector of FIG. 7.

As shown in FIG. 8, the image display system 400 may have a configuration in which the assignment control apparatus 10 is incorporated into the selector 96 of the display control device 95. FIG. 8 partially shows the configuration of the image display system 400. In this configuration, determination units B7 to B12 determine the categories "person," "ball," and the like, and specialized devices C7 to C12 perform a process specialized in one of the categories "person," "ball," and the like. That is, in the configuration of FIG. 8, the determination units B and specialized devices C perform a process similar to that of the selection unit 97. Thus, the load is distributed to the determination units B and specialized devices C, resulting in a reduction in the per-processor load.

While FIG. 6 shows an example in which the cameras are oriented toward the inside of the field, this example is not limiting and at least one of the cameras A and actuators X may be oriented toward the seats or bench. While FIGS. 6 to 8 show examples of the image display system 400 including six cameras A and six actuators X, these examples are not limiting and the number of cameras A and the number of actuators X may be changed arbitrarily. Note that the actuator unit 90 may include actuators X other than movable cameras.

Figure 9:
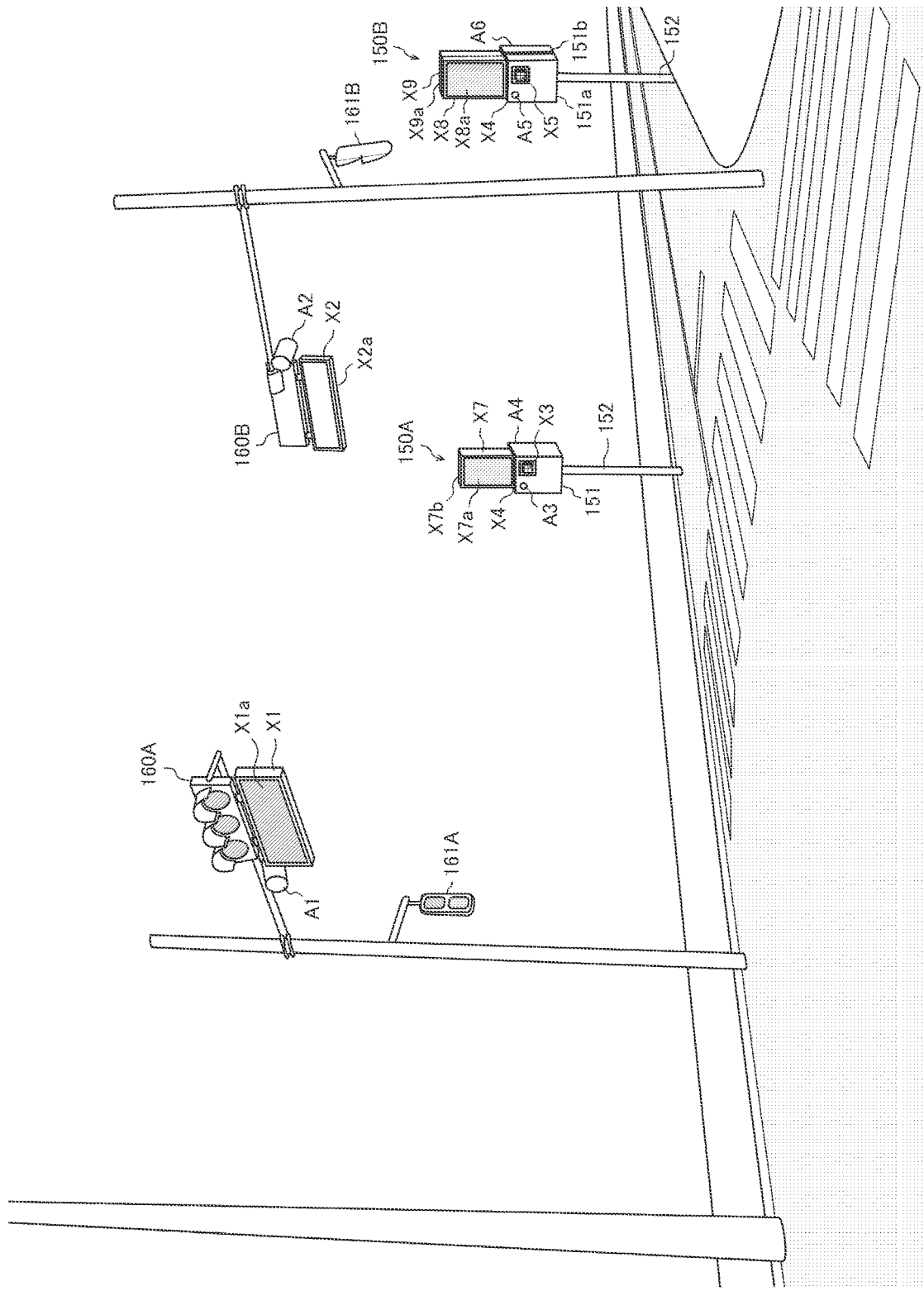
FIG. 9 is a drawing showing an example in which the assignment control system of FIG. 1 is applied to a street.
Figure 10:
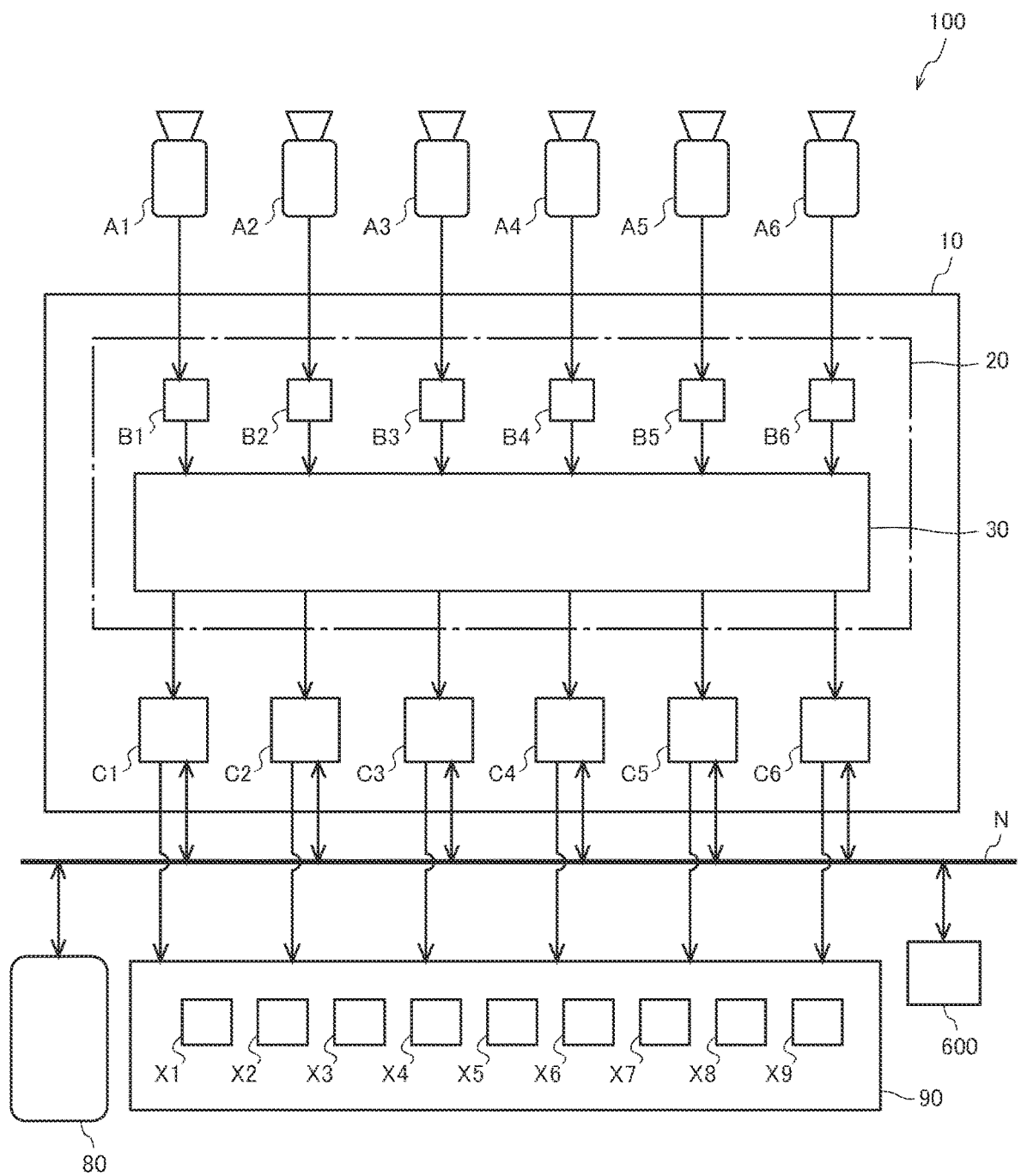
FIG. 10 is a block diagram showing the assignment control system of FIG. 1 associated with the situation of FIG. 9.

Next, referring to FIGS. 9 and 10, an example will be described below in which the assignment control system 100 is applied to a street. FIGS. 9 and 10 show an example in which the assignment control system 100 includes six cameras A, the assignment control apparatus 10 includes six determination units B and six specialized devices C, and the actuator unit 90 includes nine actuators X. It is assumed that the specialized devices C1 and C2 correspond to a category "automobile," the specialized devices C3 and C4 correspond to the category "person," the specialized device C5 corresponds to a category "bicycle," and the specialized device C6 corresponds to the category "ball." It is also assumed that the actuators X1, X2, X7, X8, and X9 are electric display boards including a light source such as an LED and the actuators X3 to X6 are notification means including a speaker.

In the example of FIG. 9, the camera A1 and actuator X1 are installed near a traffic signal 160A. The display board X1a of the actuator X1 is installed such that it can be visually recognized from automobiles coming toward the traffic signal 160A. The camera A2 and actuator X2 are installed near a traffic signal 160B. The display board X2a of the actuator X2 is installed such that it can be visually recognized from automobiles coming toward the traffic signal 160B. A traffic signal 161A and a traffic signal 161B are installed at the ends of a crosswalk and opposed to each other.

A monitoring/warning unit 150A includes a housing 151 housing the camera A3, camera A4, actuator X3, and actuator X4, a leg 152 supporting the housing 151, and the actuator 7 installed on the top of the housing 151. The actuator X7 includes a display board X7a and a display board X7b.

A monitoring/warning unit 150B includes a first housing 151a housing the camera A5 and actuator X5, a second housing 151b housing the camera A6 and actuator X6, and a leg 152 supporting the first housing 151a and second housing 151b. The monitoring/warning unit 150B also includes the actuators X8 and X9 installed on the top of the first housing 151a and second housing 151b. The actuator X8 includes a display board X8a, and the actuator X9 includes a display board X9a.

In this configuration, when the specialized devices C1 and C2 acquire image data from the assignment unit 30, they determine the attribute of the category "automobile" of the image data. Examples of the attribute of the category "automobile" include "pay attention to speed," "inattentive driving," "distracted driving," "weaving driving," and "driving without light at night." For example, if the specialized device C1 determines that the attribute of the image data captured by the camera A1 is "driving without light at night," it outputs, to the actuator X1, a control signal instructing the actuator X1 to make an attention calling display "turn on light." Thus, the actuator X1 displays characters or the like to call attention on the display board X1a. Hereafter, a control signal instructing an actuator to output a voice to call attention is also referred to as an "attention calling signal."

When the specialized devices C3 and C4 acquire image data from the assignment unit 30, they determine the attribute of the category "person" of the image data. Examples of the attribute of the category "person" include "child," "person using cane," "wheelchair," "running person," "using smartphone while doing something," "group," and "suspicious person." For example, if the specialized device C4 determines that the attribute of the image data captured by the camera A3 is "child," it outputs, to the actuator X3, an attention calling signal instructing the actuator X3 to output a voice "pay attention to vehicle." Thus, the actuator X3 outputs a voice to call attention.

When the specialized device C5 acquires image data from the assignment unit 30, it determines the attribute of the category "bicycle" of the image data. Examples of the attribute of the category "bicycle" include "sidewalk," "using smartphone while doing something," "pay attention to speed," "weaving driving," and "double riding." As attributes related to speed, attributes representing steps such as "high speed," "medium speed," and "low speed" may be set. Here, it is assumed that travel of a bicycle on a sidewalk is prohibited in the place of FIG. 9 and information to that effect is set in each specialized device C. In this situation, when the specialized device C5 determines that the attribute of the image data captured by the camera A4 is "sidewalk," it outputs, to the actuator X4, an attention calling signal instructing the actuator X4 to output a voice such as "travel on bicycle lane" or "travel on sidewalk is prohibited." Thus, the actuator X4 outputs an attention calling voice.

When the specialized device C6 acquires image data from the assignment unit 30, it determines the attribute of the category "ball" of the image data. Examples of the attribute of the category "ball" include "bound" indicating a situation in which a person is bounding a ball with a hand, "dribble" indicating a situation in which a person is kicking a ball with a leg, and "throw" indicating a situation in which a person is throwing a ball with a hand. For example, if the specialized device C6 determines that the attribute of the image data captured by the camera A5 is "bound," it outputs, to the actuator X5, an attention calling signal instructing the actuator X5 to output a voice "it's dangerous, hold ball firmly with hands." Thus, the actuator X5 outputs an attention calling voice.

Each specialized device C may output control signals to multiple actuators X. It seems that main images included in image data captured by the cameras A1 and A2 are typically automobiles. For this reason, if it is determined that the category of image data captured by the camera A1 or A2 is "person," "ball," or the like, it is particularly necessary to give a warning. For this reason, if a specialized device C corresponding to a category other than the category "automobile" receives image data captured by the camera A1 or A2, it is preferred to reflect information to that effect on the process performed by a corresponding actuator X. For example, if the specialized device C3 acquires image data captured by the camera A2, it may output, to the actuator X6, an attention calling signal instructing the actuator X6 to output a voice "it's dangerous, return to sidewalk." At this time, the specialized device C3 may also output, to the actuator X9, a control signal instructing the actuator X9 to make an attention calling display "dangerous!" Similarly, if one specialized device C acquires, from another camera A, image data including an object that must not usually be present, the specialized device C may set a special process in accordance with the installation position or the like of the camera A.

As shown in FIG. 10, each specialized device C may acquire traffic signal data indicating the status of each traffic signal from a traffic signal controller 600 connected to the network N and reflect the acquired traffic signal data on its process. For example, when the traffic signals 161A and 161B are green and the camera A2 captures an image of a scene in which an automobile is traveling toward the crosswalk at tremendous speed, the specialized device C1 or C2 may output, to the actuator X2, an attention calling signal instructing the actuator X2 to output a voice "slow down!" Note that multiple specialized devices C may control the actuator unit 90 by cooperating with each other.

While the monitoring/warning units 150A and 150B including one or more cameras A and one or more actuators X are shown in FIG. 9, these are illustrative only and the installation positions, numbers, shapes, or the like of the cameras A and actuators X are not limited to the example of FIG. 9. The same applies to the other drawings. For example, the monitoring/warning unit 150A may be configured such that the actuator X7 can be automatically or manually rotated using a straight line or the like along the leg 152 as an axis. For example, the monitoring/warning unit 150B may be configured such that the angle formed by the actuator X8 and actuator X9 in the horizontal direction can be automatically or manually changed.

Figure 11:
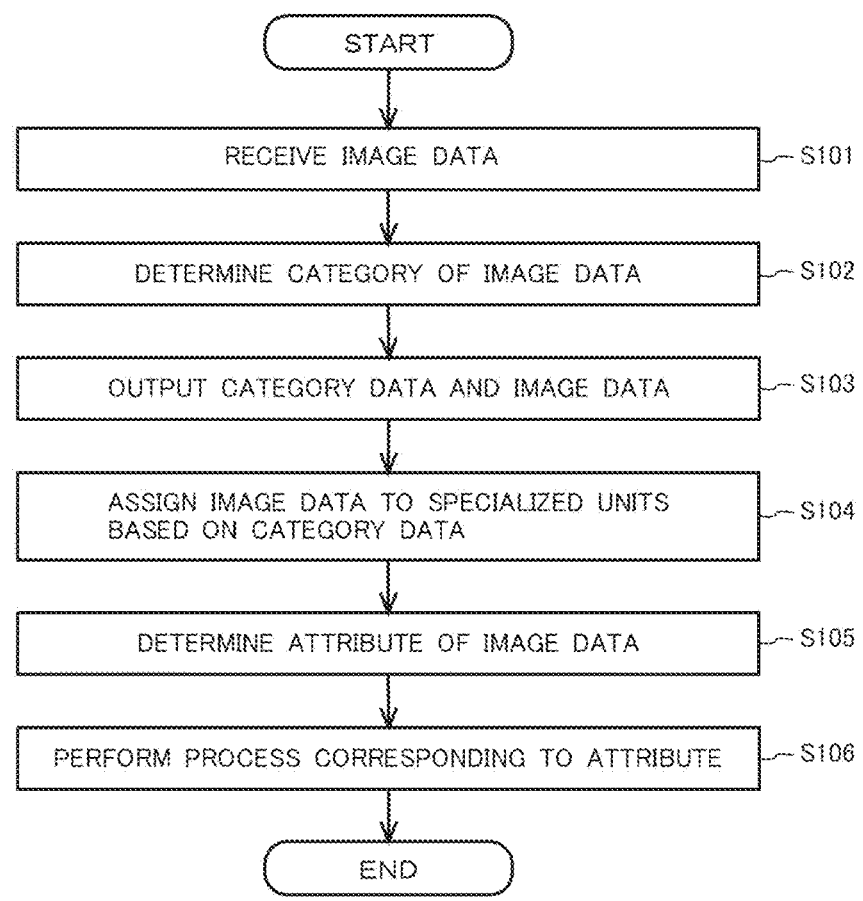
FIG. 11 is a flowchart showing an example of the operation of the assignment control apparatus of FIG. 1.

Next, referring to the flowchart of FIG. 11, an assignment control method according to the first embodiment will be described. First, the determination units B1 to Bn each receive image data from the cameras A to which the determination units are connected (step S101). Then, the determination units B1 to Bn each determine the category of the received image data, which is one of multiple categories (step S102). Then, the determination units B1 to Bn output the image data whose category has been determined to the assignment unit 30 along with category data indicating the determined category (step S103).

The assignment unit 30 assigns the image data to the specialized devices C on the basis of the category data. That is, the assignment unit 30 outputs the image data outputted from the determination units B1 to Bn to the specialized devices C corresponding to the category data outputted along with the image data (step S104).

The specialized devices C determine the attribute of the image data outputted from the assignment unit 30. This attribute is one of the attributes of the category determined by the determination unit B that has outputted the image data (step S105). The specialized device C then performs a process corresponding to the determined attribute. That is, the specialized device C selects one or more actuators X in accordance with the determined attribute and outputs control signals to the selected one or more actuators X (step S106).

As seen above, in the assignment control apparatus 10 according to the first embodiment, the determination units B connected to the cameras A determine the categories of the image data, and the assignment unit 30 outputs the image data to the specialized devices C corresponding to the categories determined by the determination units B. Thus, the assignment control apparatus 10 is able to distribute the load to the determination units B and specialized devices C and thus is able to reduce the load on each processor and allows the image data to be smoothly used for a variety of applications. That is, the assignment control apparatus 10 allows the image data to be efficiently used for applications corresponding to information included in the image data.

Each specialized device C determines the attribute of the image data outputted from the assignment unit 30, which is one of the multiple attributes, and performs a process corresponding to the determined attribute. That is, each specialized device C is allowed to mainly perform image analysis on the image data of the category in which the specialized device C specializes. Thus, the throughput of each specialized device C is reduced and thus the assignment control apparatus 10 speeds up the entire process. That is, the assignment control apparatus 10 distributes multiple processes to the processors and reduces the load on each processor and thus is able to speed up the entire process, as well as is able to reduce the number of high-performance processors and to reduce cost. Also, each specialized device C outputs a control signal corresponding to the determined attribute of the image data to at least one of multiple actuators X controlled by the specialized device C, and the actuator(s) X performs an operation corresponding to the control signal. Thus, the assignment control apparatus 10 allows the actuators X corresponding to the attributes of the image data to operate quickly.

As described above, the specialized devices C1 to Cm may include specialized devices C corresponding to different categories. That is, the assignment control apparatus 10 may include specialized devices C corresponding to different categories. For example, as shown in FIG. 3, the specialized devices C1 to Cm may include two or more specialized devices C corresponding to the same category. That is, in the assignment control apparatus 10, some of the specialized devices C1 to Cm may be specialized devices C corresponding to the same category. As seen above, in the assignment control apparatus 10, the combinations of the specialized devices C can be changed in accordance with the installation environment of the cameras A, or the like. For example, the number of specialized devices C corresponding to an object that more frequently appears in image data can be relatively increased. Thus, a state in which one or more assignment control apparatus 10 are not functioning is made less likely to occur, and a process delay can be avoided.

Also, all the specialized devices C1 to Cm may be specialized devices C corresponding to different categories. That is, in the assignment control apparatus 10, all the specialized devices C1 to Cm may be specialized devices corresponding to different categories. This configuration is useful, for example, in a situation in which objects included in image data are changed regularly or irregularly.

On the other hand, all the specialized devices C1 to Cm may be specialized devices corresponding to the same category. That is, in the assignment control apparatus 10, all the specialized devices C1 to Cm may be specialized devices corresponding to the same category. This configuration is useful, for example, in a situation in which a variety of birds are interfering with the flight of the flying object 500. In such a situation, the specialized devices C of the assignment control apparatus 10 may be only specialized devices C specializing in birds. Similarly, in a situation in which terrestrial animals mainly damage a field or the like, the specialized devices C of the assignment control apparatus 10 may be only specialized devices C specializing in terrestrial animals. Also, there may be a need to monitor only persons in an event site, the inside of a station, a place for storing important secret, cash, or the like in a company or financial institution, a department store, a convenience store, a parking lot, a park, a street, an intersection, or the like. In such a case, the specialized devices C of the assignment control apparatus 10 may be only specialized devices C specializing in persons. By including only specialized devices C corresponding to the same category in the assignment control apparatus 10 in accordance with the installation environment of the cameras A, or the like as described above, a situation in which there are specialized devices C that hardly function can be avoided. Thus, waste can be avoided, resulting in a reduction in cost.

The assignment control system 100 according to the first embodiment includes the assignment control apparatus 10 and the actuators X controlled by the assignment control apparatus 10. Each specialized device C performs a process corresponding to the determination made with respect to the image data, for example, outputs a control signal corresponding to the determined attribute to at least one actuator X. Thus, the assignment control system 100 allows the actuators X corresponding to the attributes of the image data to operate quickly.

While the assignment control system 100 has been described above as including the cameras A1 to An, the assignment control system 100 is not limited to this configuration and may be configured without including the cameras A1 to An. That is, the cameras A1 to An may be external devices, which are not included in the assignment control system 100. The assignment control system 100 may or may not include the update processor 80. Each specialized device C may additionally have a function of determining whether an operation command needs to be issued to the actuator X, on the basis of analysis of the image data. That is, each specialized device C may not output a control signal to the actuator X if it determines that an operation command does not need to be issued to the actuator X.

<Modification 1-1>

Figure 12:
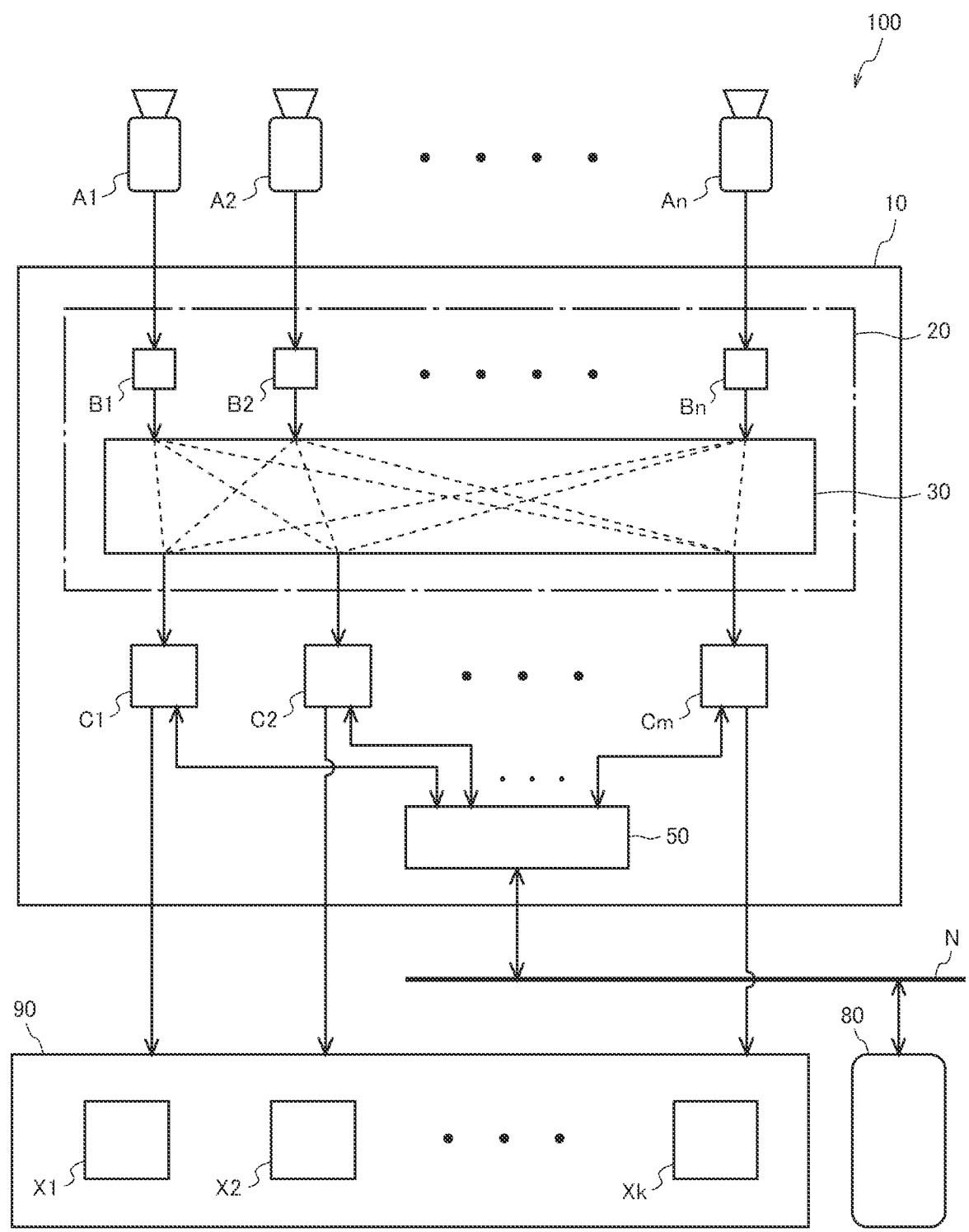
FIG. 12 is a block diagram showing an example configuration of an assignment control apparatus and assignment control system according to a modification 1-1 of the first embodiment of the present invention.

As shown in FIG. 12, an assignment control apparatus 10 according to a modification 1-1 includes a central update unit 50 that updates the analysis programs 432 of specialized devices C in cooperation with an update processor 80. For this reason, the update means 44c of each specialized device C serves as relay means between the central update unit 50 and storage means 43b. The central update unit 50 and update processor 80 may communicate with each other by wire, wirelessly, or both.

That is, the assignment control apparatus 10 according to the modification 1-1 further includes the central update unit 50 connected to the specialized devices C. Each specialized device C has the analysis processor program 432 related to the determination of the attribute and outputs image data and analysis information to the central update unit 50. The central update unit 50 transmits the image data and analysis information outputted from the specialized devices C to the update processor 80. The update processor 80 updates the analysis programs 432 of the specialized devices C on the basis of the image data and analysis information transmitted from the central update unit 50 and transmits the updated analysis programs 432 to the central update unit 50. The central update unit 50 transfers the analysis programs 432 updated and transmitted by the update processor 80 to the specialized devices C corresponding to the attributes of the analysis programs 432. That is, the update processor 80 transmits the updated analysis programs 432 to the specialized devices C through the central update unit 50. Thus, each specialized device C is able to update the analysis program 432 in the storage unit 43 on the basis of the updated analysis program 432 acquired from the central update unit 50.

As seen above, the assignment control apparatus 10 according to the modification 1-1 is able to assign a part of the load on each specialized device C to the central update unit 50 and to reduce the throughput of the specialized device C and thus to perform the process more quickly. This assignment control apparatus 10 also allows for downgrading of the specification of the specialized devices C and thus a reduction in cost.

<Modification 1-2>

Figure 13:
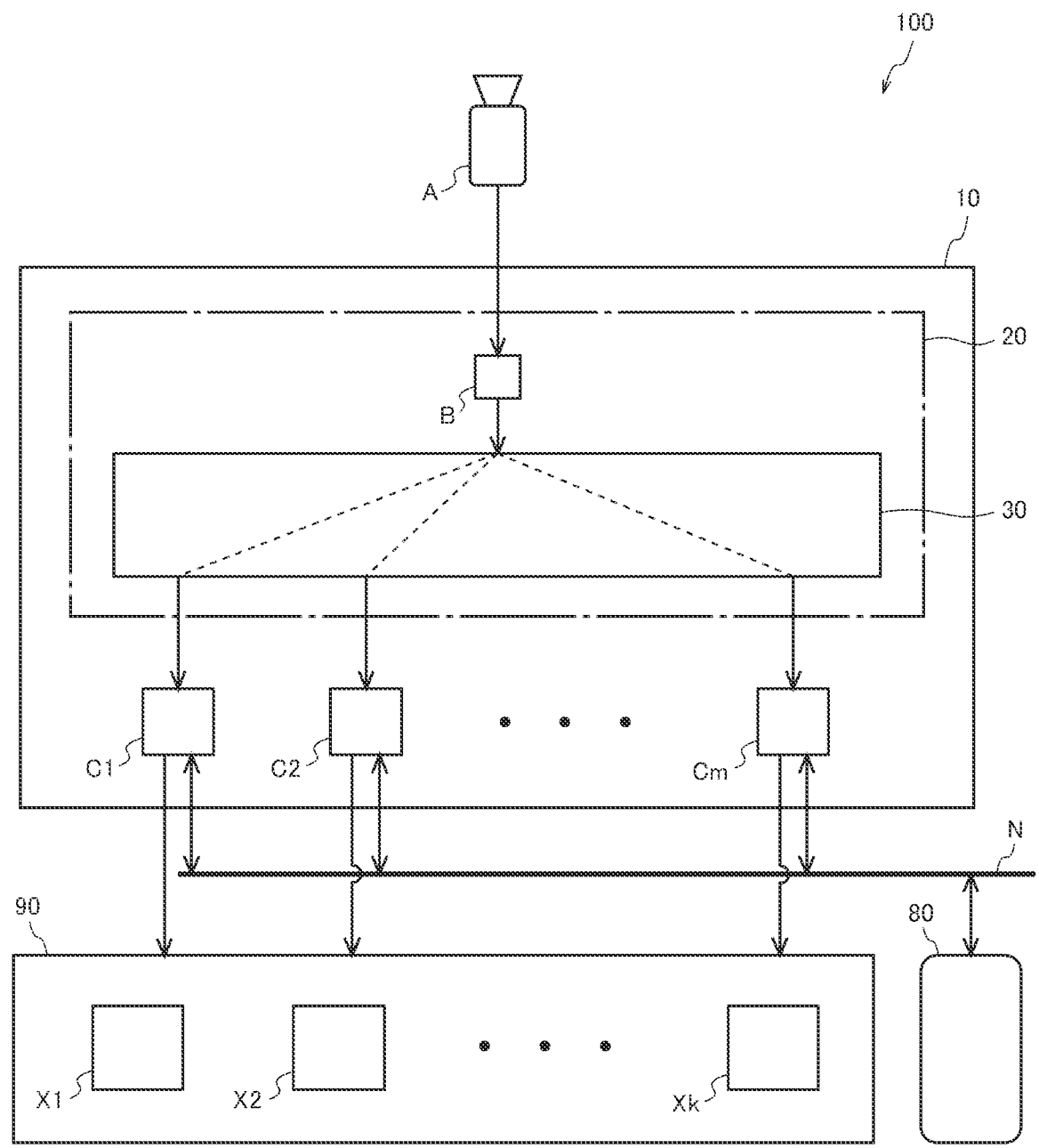
FIG. 13 is a block diagram showing an example configuration of an assignment control apparatus and assignment control system according to a modification 1-2 of the first embodiment of the present invention.

While the examples in which the assignment control system 100 includes the multiple cameras A have been described above, an assignment control system 100 according to a modification 1-2 includes a single camera A, as shown in FIG. 13. That is, the single camera A is connected to an assignment control apparatus 10 according to the modification 1-2.

More specifically, the assignment control apparatus 10 includes an assignment device 20 connected to the camera A and multiple specialized devices C1 to Cm each corresponding to one of multiple categories. The specialized devices C1 to Cm are connected to the assignment device 20. The assignment device 20 includes a determination unit B connected to the camera A. The determination unit B determines the category of image data received from the cameras A, which is one of the categories, and outputs the image data to an assignment unit 30 along with category data indicating the determined category. The assignment unit 30 outputs the image data outputted from the determination unit B to a specialized device C corresponding to the category indicated by the category data outputted along with the image data.

The other components of the assignment control apparatus 10 and assignment control system 100 and details of the assignment control method are similar to those described with reference to FIGS. 1 to 11. Also, the configuration of the modification 1-1 described above may be applied to the configuration of the modification 1-2.

As seen above, the assignment control apparatus 10 according to the modification 1-2 is also able to distribute the load to the determination unit B and specialized devices C. Thus, this assignment control apparatus 10 reduces the load on each processor and allows image data to be smoothly used for a variety of applications. That is, this assignment control apparatus 10 allows the purpose of the image data to be flexibly changed in accordance with information included in the image data, which changes from time to time.

Figure 14:
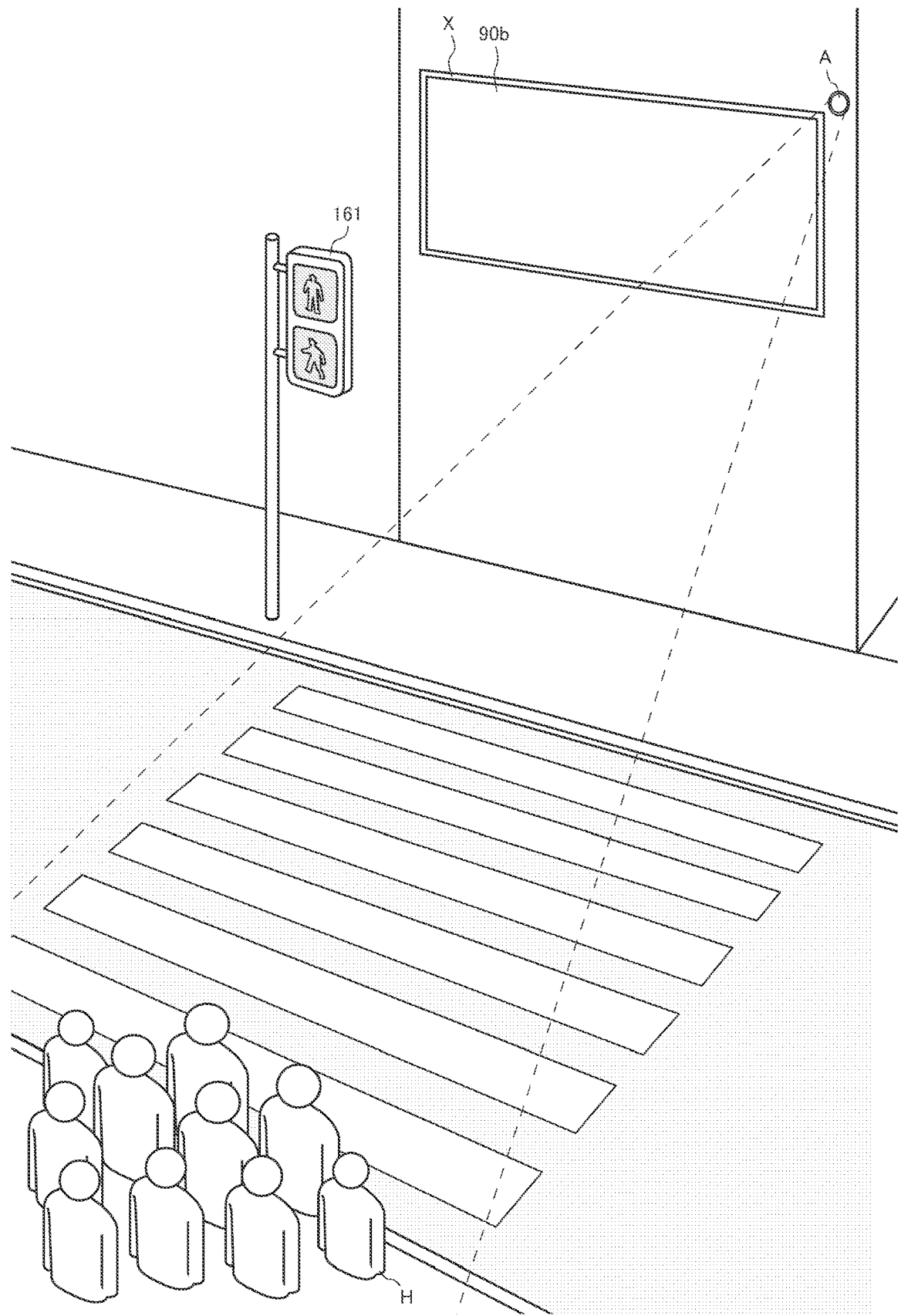
Figure 15:
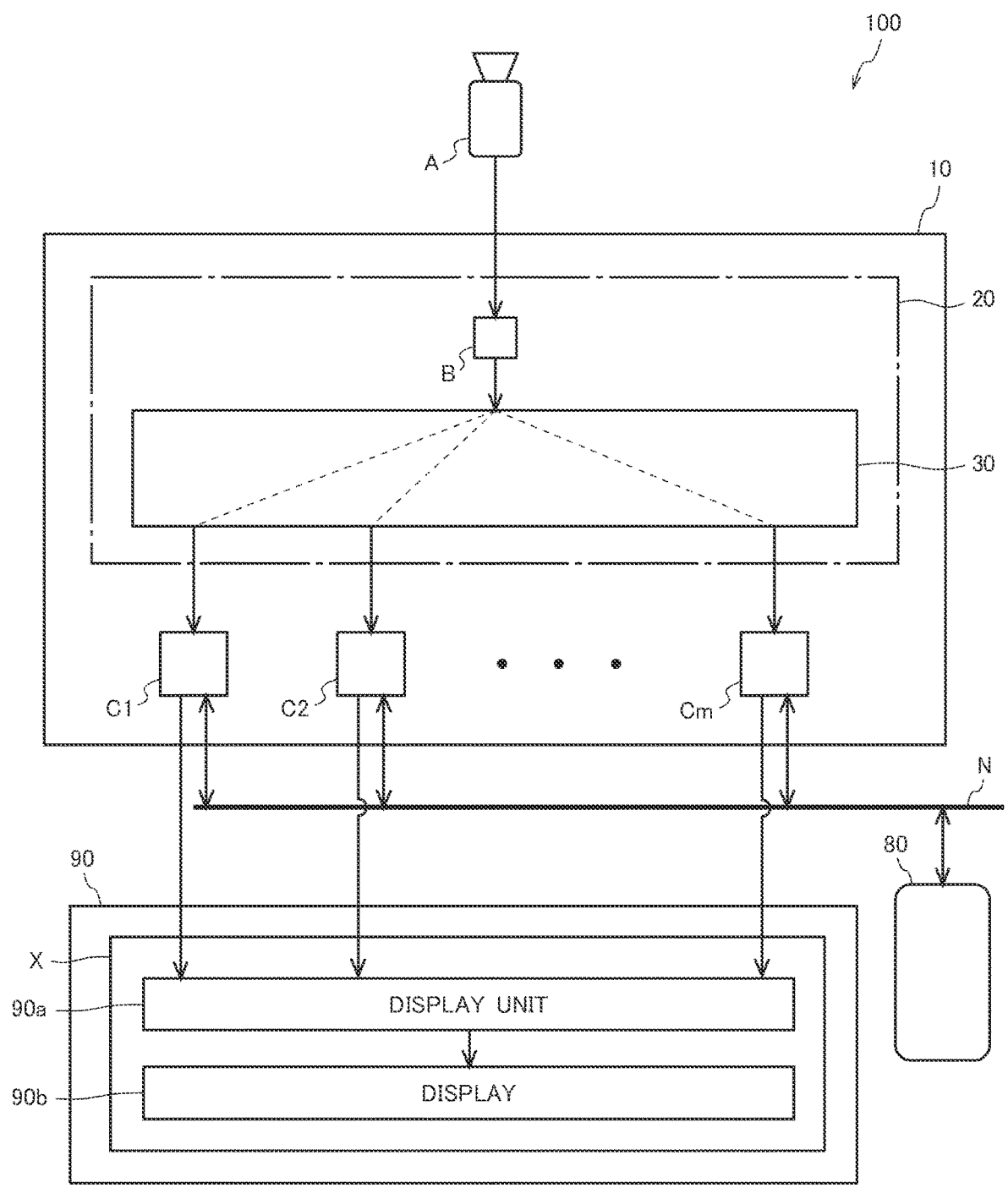
FIG. 15 is a block diagram showing the assignment control system of FIG. 13 associated with the situation of FIG. 14.

Referring to FIGS. 14 to 17, an example will be described below in which the assignment control system 100 according to the modification 1-2 is applied to an intersection on a street, or the like. FIGS. 14 and 15 show an example of a display device including a display unit 90a and a display 90b as actuators X forming an actuator unit 90. The image capture range of the camera A includes a waiting area on the side opposite to a traffic signal 161 of a crosswalk. It is assumed that persons H standing in the waiting area can visually recognize the display 90b, which is an actuator X.

Figure 16:
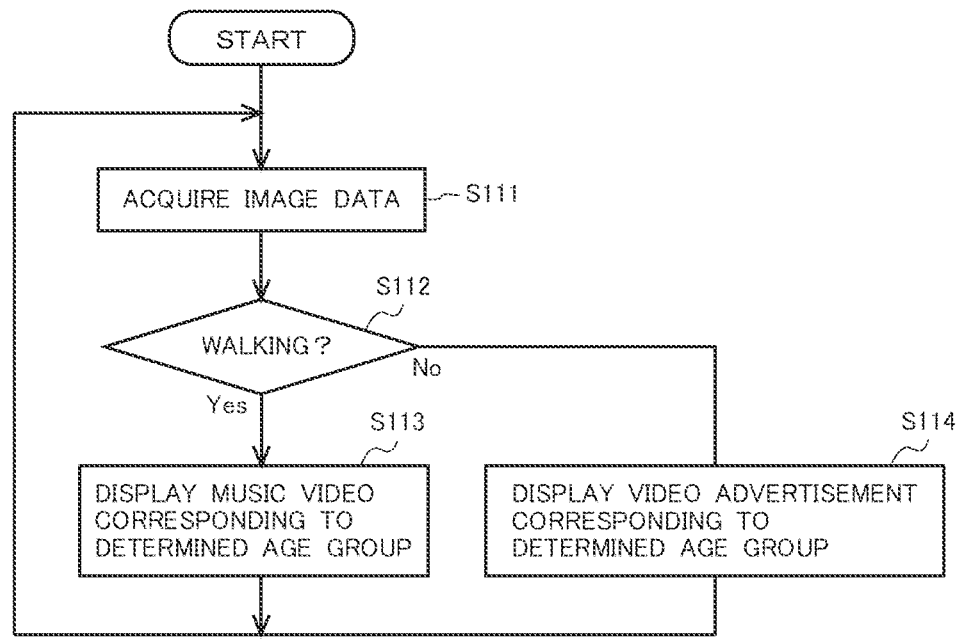
FIG. 16 is a flowchart showing an example of the operation of each specialized device of the assignment control apparatus of FIG. 13.

First, referring to the flowchart of FIG. 16, an example of a process performed by the assignment control apparatus 10 will be described. In the example of FIG. 16, it is assumed that a determination unit B determines, as the category of image data, a main age group of persons included in the image data, that is, an age group that persons included in the image data mostly belong to. For this reason, the determination unit B determines an age group such as 20s, 30s, 40s, 50s, 60s, 70s, or 80s or more as the category of the image data, and each specialized device C is configured to correspond to one of the multiple age groups. Note that the age group need not be a 10-year basis as described above and the age range may be narrowed or widened. Also, an age range may be set for each age group, and age groups having different age ranges may be combined.

One specialized device C acquires image data from the assignment unit 30 (step S111) and makes, as the attribute of the image data, a determination as to whether relatively many persons are walking in the acquired image data (step S112). If the specialized device C determines that relatively many persons are walking (step S112: YES), it displays a music video corresponding to the determined age group on the actuator X (step S113). On the other hand, if the specialized device C determines that relatively many persons are waiting for the signal to change (step S112: NO), it causes the actuator X to display a video advertisement corresponding to the determined age group (step S114).

Figure 17:
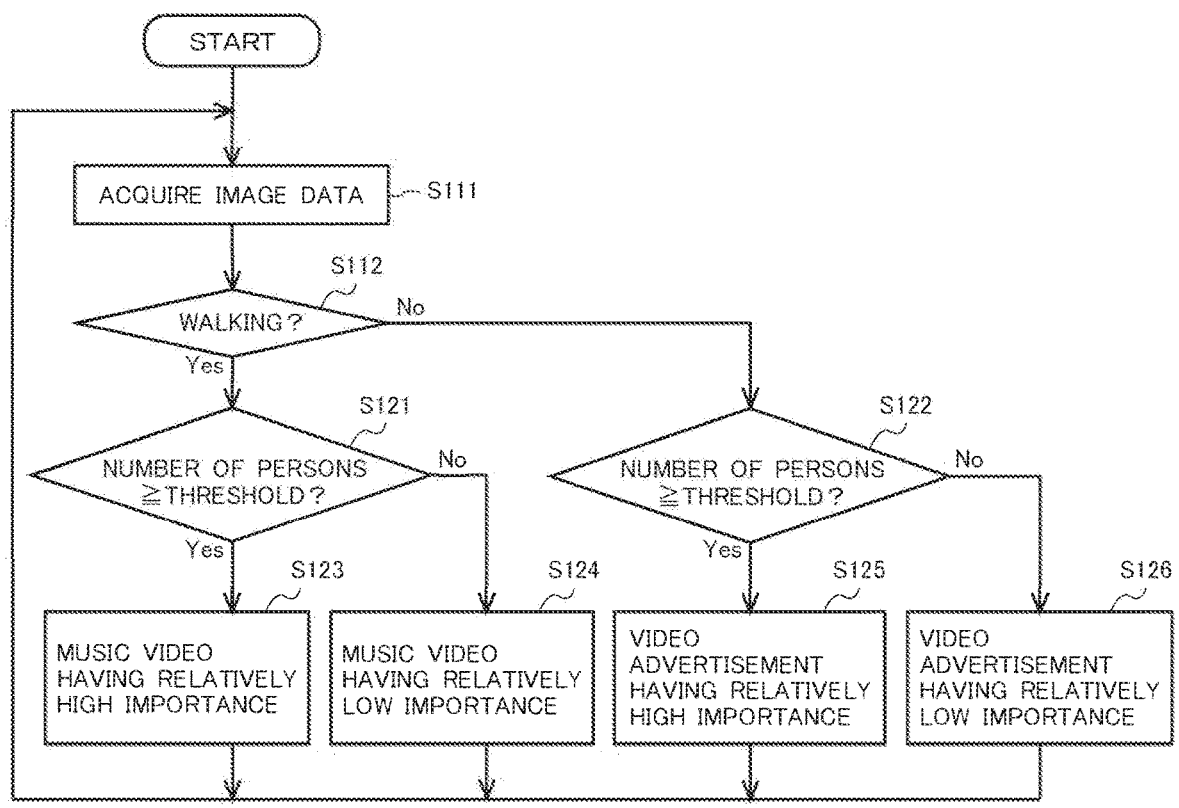
FIG. 17 is a flowchart showing another example of the operation of each specialized device of the assignment control apparatus of FIG. 13.

Next, referring to the flowchart of FIG. 17, another example of a process performed by the assignment control apparatus 10 will be described. Steps similar to those in FIG. 16 are given the same reference signs and will not be described. In the example of FIG. 17, multiple attributes are set by combining the determination made by each specialized device C as to whether relatively many persons are walking and the determination made by the specialized device C as to whether the number of persons included in the image data is equal to or greater than a threshold.

That is, if one specialized device C determines that relatively many persons are walking (step S112: YES), it determines whether the number of persons included in the image data is equal to or greater than the preset threshold (step S121). If the number of persons is equal to or greater than the threshold (step S121: YES), the specialized device C causes the actuator X to display a music video having relatively high importance (step S123). On the other hand, if the number of persons is smaller than the threshold (step S121: NO), the specialized device C causes the actuator X to display a music video having relatively low importance (step S124).

If the specialized device C determines that relatively many persons are not walking (step S112: NO), it determines whether the number of persons included in the image data is greater than a preset threshold (step S122). If the number of persons is equal to or greater than the threshold (step S122: YES), the specialized device C causes the actuator X to display a video advertisement having relatively high importance (step S125). On the other hand, if the number of persons is smaller than the threshold (step S122: NO), the specialized device C causes the actuator X to display a video advertisement having relatively low importance (step S126). Note that the threshold in step S121 and the threshold in step S122 may be the same or different. Also, more detailed values may be set as the threshold related to the number of persons.

In the description with reference to FIGS. 16 and 17, the associations of music video or video advertisement with the determinations are illustrative only. That is, the assignment control apparatus 10 may cause the actuator X to display various videos or still images by setting such associations in accordance with the preferences of the sponsor, or the like. Moreover, each specialized device C may select a video or still image using a classifier generated by performing learning such as deep learning and cause the actuator X to display the selected video or still image.

The example of FIGS. 16 and 17 is not limiting. For example, the determination unit B may make, as the category of image data, a determination as to whether relatively many persons are walking in the image data. In this case, each specialized device C corresponds to one of the category "walking" and category "waiting for traffic signal to change" and determines the age group as the attribute of the image data. For example, each specialized device C may determine the age group, then select a video or still image with reference to table information in which multiple age groups and videos to be displayed are associated with each other, and cause the actuator X to display the selected video or still image. Or, each specialized device C may select a video or still image using a classifier generated by performing learning such as deep learning and cause the actuator X to display the selected video or still image. Note that each specialized device C may determine the attribute that is the combination of the determination as to the age group and the determination as to whether the number of persons included in the image data is equal to or greater than the threshold.

Second Embodiment

Figure 18:
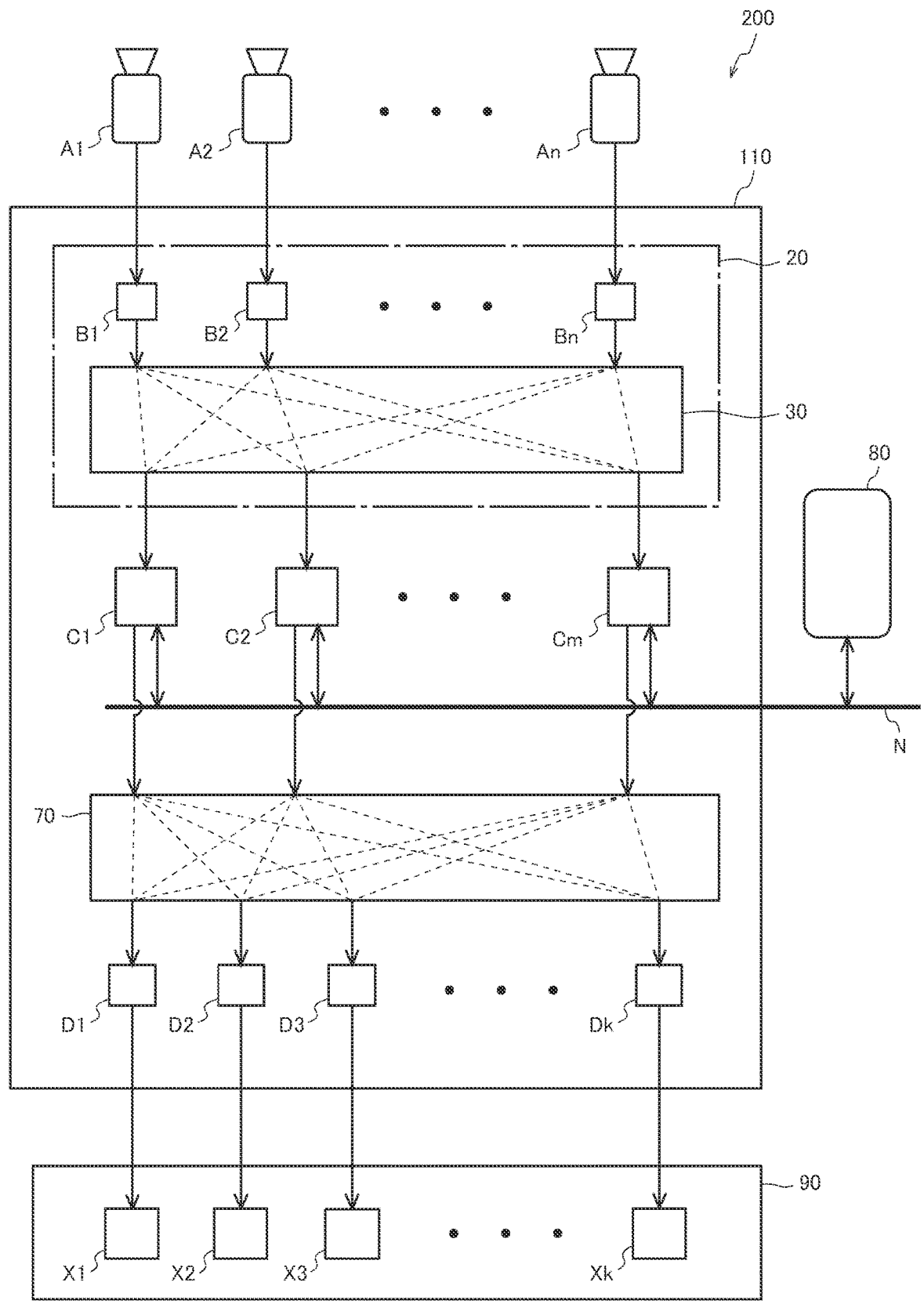
FIG. 18 is a block diagram showing an example configuration of an assignment control apparatus and assignment control system according to a second embodiment of the present invention.

Referring to FIG. 18, the configuration of an assignment control apparatus and assignment control system according to a second embodiment will be described. Components similar to those of the first embodiment are given the same reference signs and will not be described.

An assignment control system 200 includes multiple cameras A1 to An, an assignment control apparatus 110, and an actuator unit 90. The assignment control apparatus 110 includes an assignment device 20 including multiple determination units B1 to Bn and an assignment unit 30 and multiple specialized devices C1 to Cm.

The assignment control apparatus 110 also includes an attribute assignment unit 70 connected to the specialized devices C1 to Cm and multiple attribute units D1 to Dk each corresponding to one of multiple attributes. The attribute units D1 to Dk are connected to the attribute assignment unit 70. The attribute units D1 to Dk are collectively referred to as the "attribute units D."

Each specialized device C determines the attribute of image data outputted from the assignment unit 30. This attribute is one of the attributes of the category of the image data determined by the determination unit B that has outputted the image data. The specialized device C according to the first embodiment then outputs the determination, that is, attribute data indicating the determined attribute to the attribute assignment unit 70.

As shown by broken lines in FIG. 18, the assignment unit 70 has m×k routes (options) through which it assigns the attribute data received from the specialized devices C1 to Cm to one of the attribute units D1 to Dk. The attribute assignment unit 70 outputs the attribute data outputted from each specialized device C to an attribute unit D corresponding to an attribute indicated by the attribute data. The attribute assignment unit 70 consists of, for example, an FPGA. The attribute assignment program of the attribute assignment unit 70, which is a logic program, can be changed as appropriate in accordance with the use case.

Each attribute unit D corresponds to a single attribute, that is, one piece of attribute data. Each attribute unit D receives attribute data outputted from the attribute assignment unit 70 and performs a process corresponding to the attribute data. As with the above-mentioned specialized devices C, the attribute units D each include a communication unit, a storage unit, and a controller, which are not shown. The controller consists of, for example, a CPU or GPU. The storage unit is storing information indicating a process associated with each attribute data. In the second embodiment, each attribute unit D receives attribute data outputted from the attribute assignment unit 70 and outputs a control signal indicating a process previously associated with the attribute data to an actuator X to which the attribute unit D is connected.

Each specialized device C may output attribute data including additional information indicating details of control of an actuator X. For example, if the actuator X is notification means, the additional information is information indicating the volume, speech, or the like. If the actuator X is light-emitting means, the additional information is information indicating brightness, luminescent color, or the like. In this case, the attribute unit D generates a control signal on the basis of the attribute data and outputs the generated control signal to the destination actuator X. Note that the internal storage device of each attribute unit D may store table information in which multiple pieces of additional information and details of control of the destination actuator X are associated with each other. In this case, the attribute unit D generates a control signal while checking the additional information included in the attribute data against the table information.

Each specialized device C may have a function of determining whether there is a need to issue an operation command to an actuator X by analyzing image data. In this case, if the specialized device C determines that there is no need to issue an operation command to the actuator X, it need not output attribute data. Or, the specialized device C may output attribute data including additional information indicating that there is no need to control the actuator X.

Figure 19:
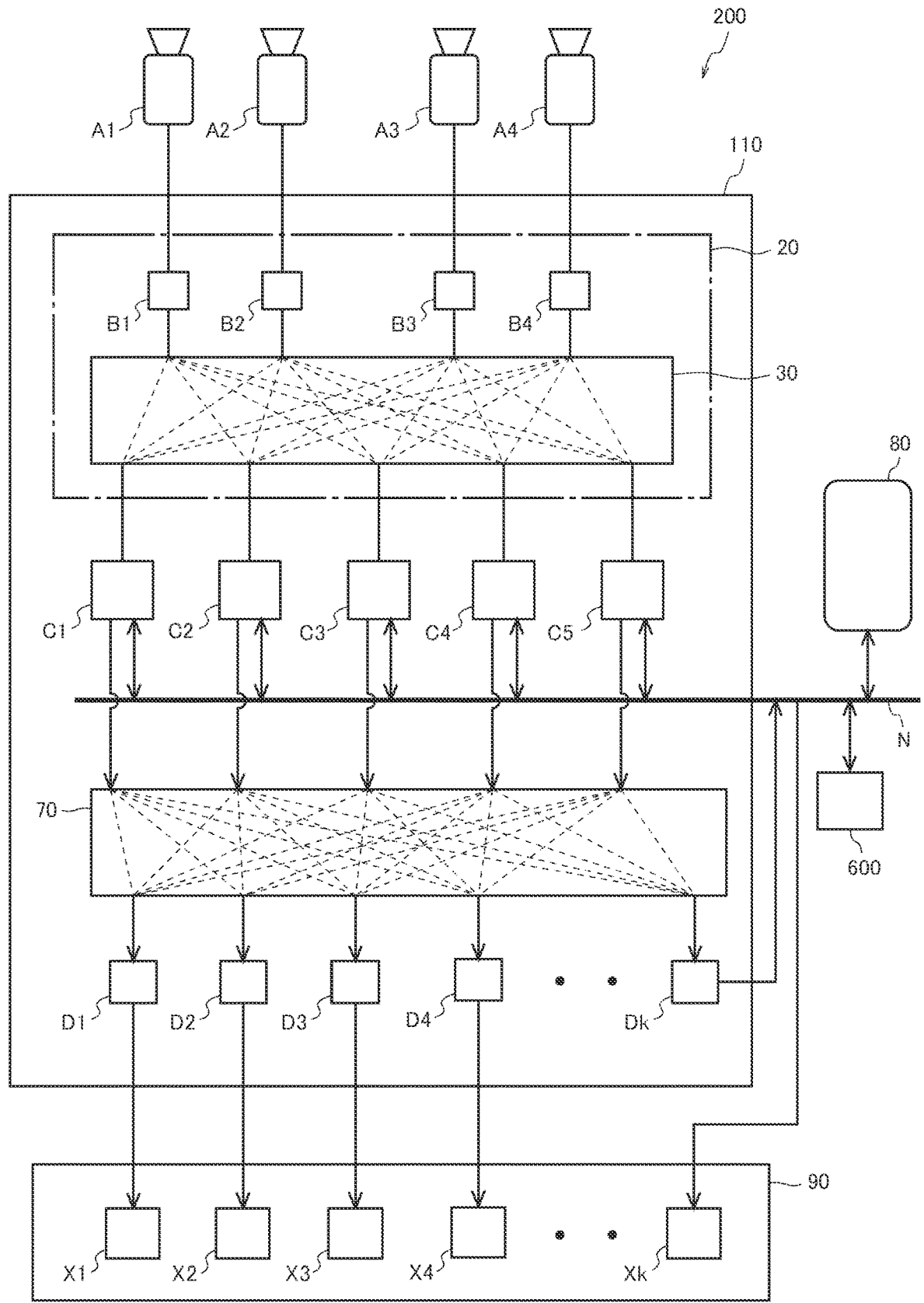
FIG. 19 is a block diagram showing an example application of the assignment control system of FIG. 18.

Next, referring to FIG. 19, an example application of the assignment control system 200 will be described. An example will be described below in which the assignment control system 200 is applied to the monitoring of a crosswalk and its vicinity. FIG. 19 shows an example in which the assignment control system 200 includes four cameras A, the assignment control apparatus 110 includes four determination units B, five specialized devices C, and k number of attribute units D, and the actuator unit 90 includes k number of actuators X. In the example of FIG. 19, a traffic signal controller 600 is connected to a network N, and each specialized device C can acquire traffic signal data indicating the status of a traffic signal (not shown) from the traffic signal controller 600.

In the following description, it is assumed that the specialized devices C1 and C2 correspond to the category "person," the specialized device C3 corresponds to the category "bicycle," the specialized device C4 corresponds to the category "ball," and the specialized device C5 corresponds to the category "automobile." It is also assumed that the attribute unit Dk corresponds to operation control through the network N and the actuator Xk is notification means that is installed in an automobile that passes an area monitored by the cameras A and emits a sound or voice.

In this example, the specialized devices C1 and C2 acquire image data from the assignment unit 30 and determine the attribute of the category "person" of the image data. For example, it is assumed that the attribute unit D3 corresponds to an attribute "suspicious person" indicating a person making a suspicious movement and that the specialized device C1 outputs attribute data indicating the attribute "suspicious person" to the attribute assignment unit 70 and the attribute assignment unit 70 outputs the attribute data to the attribute unit D3. It is also assumed that the actuator X2 is notification means capable of outputting a voice and the actuator X3 is an electric display board. It is also assumed that a process of causing the actuator X2 to output an attention calling voice and a process of causing the actuator X3 to display characters for warning are associated with the attribute data indicating the attribute "suspicious person." In this case, the attribute unit D3 outputs an attention calling signal to the actuator X2, as well as outputs, to the actuator X3, a control signal instructing the actuator X3 to display characters for warning.

When the specialized device C3 acquires image data from the assignment unit 30, it determines the attribute of the category "bicycle" of the image data. For example, it is assumed that the attribute unit D4 corresponds to the attribute "using smartphone while doing something" and that the specialized device C3 outputs attribute data indicating the attribute "bicycle" to the attribute assignment unit 70 and the attribute assignment unit 70 outputs the attribute data to the attribute unit D4. It is also assumed that the actuator X1 is notification means and a process of causing the actuator X1 to output a warning sound is associated with the attribute data indicating the attribute "smartphone while doing something." In this case, the attribute unit D4 outputs, to the actuator X1, a control signal instructing the actuator X1 to output a warning sound.

When the specialized device C4 acquires image data from the assignment unit 30, it determines the attribute of the category "ball" of the image data. For example, it is assumed that the attribute unit D1 corresponds to the attribute "dribble" and that the specialized device C4 outputs attribute data indicating the attribute "dribble" to the attribute assignment unit 70 and the attribute assignment unit 70 outputs the attribute data to the attribute unit D1. It is also assumed that the actuator X3 is an electric display board and a process of causing the actuator X3 to display characters for warning is associated with the attribute data indicating the attribute "dribble." In this case, the attribute unit D1 outputs, to the actuator X3, a control signal instructing the actuator X3 to display characters for warning.

When the specialized device C5 acquires image data from the assignment unit 30, it determines the attribute of the category "automobile" of the image data. For example, it is assumed that the attribute unit D2 corresponds to the attribute "weaving driving" and that the specialized device C4 outputs attribute data indicating the attribute "weaving driving" to the attribute assignment unit 70 and the attribute assignment unit 70 outputs the attribute data to the attribute unit D2. It is also assumed that the actuator X4 is an electric display board mounted on the periphery of a traffic signal and a process of causing the actuator X4 to display information recommending a rest is associated with attribute data indicating the attribute "weaving driving." In this case, the attribute unit D2 outputs, to the actuator X4, a control signal instructing the actuator X4 to display information recommending a rest.

Each specialized device C may acquire traffic signal data from the traffic signal controller 600 and determine a further segmented attribute on the basis of the acquired traffic signal data. For example, a specialized devices C may determine that the attribute of the image data is "danger" in a situation in which a pedestrian signal is red and a pedestrian is trying to cross a crosswalk.

Multiple specialized devices C may perform a determination process in cooperation with each other. One possible example of such cooperation is that a specialized device C corresponding to the category "person" transmits current event information indicating that the attribute "child" has been determined to a specialized device C corresponding to the category "bicycle" and the specialized device C of the category "bicycle" uses the current event information to determine the attribute. Moreover, a specialized device C corresponding to a category "traffic signal" may be provided in association with a camera A whose image capture range covers a traffic signal, and this specialized device C may output current event information indicating the status of the traffic signal to another specialized device C. Thus, each specialized device C is able to perform a determination process using the current event information from the specialized device C of the category "traffic signal" even if the specialized device C does not acquire traffic signal data from the traffic signal controller 600. Moreover, a specialized device C that has determined that a pedestrian has rushed out into a roadway may transmit current event information to that effect to the specialized device C of the category "automobile." Then, the specialized device C of the category "automobile" may output, to the actuator Xk, a control signal instructing the actuator Xk to emit a sound or voice through the attribute assignment unit 70, attribute unit Dk, and network.

Figure 20:
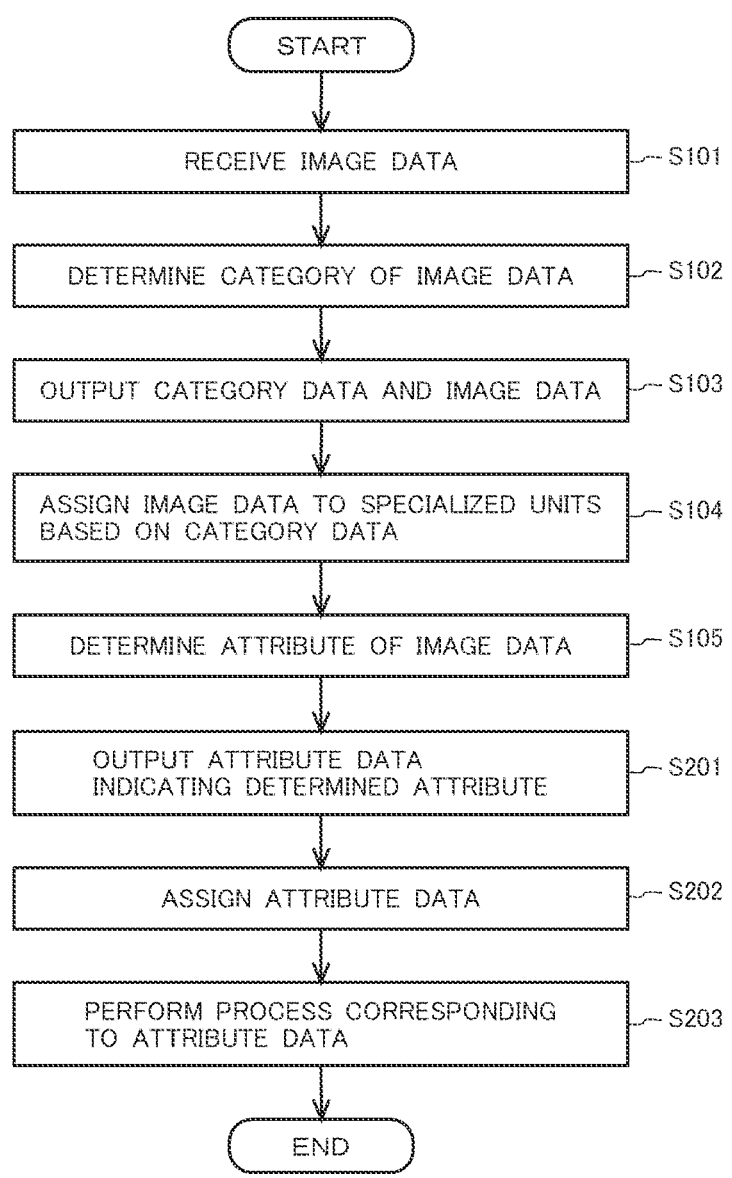
FIG. 20 is a flowchart showing an example of the operation of the assignment control apparatus of FIG. 18.

Next, referring to the flowchart of FIG. 20, an assignment control method according to the second embodiment will be described. Steps similar to those in FIG. 11 are given the same step numbers and will not be described.

First, the assignment device 20 performs steps S101 to S104. Then, each specialized device C determines the attribute of the image data outputted from the assignment unit 30. This attribute is one of the attributes of the category determined by the determination unit B that has outputted the image data (step S105). The specialized device C then outputs attribute data indicating the determined attribute to the attribute assignment unit 70 (step S201).

The attribute assignment unit 70 assigns the attribute data outputted from each specialized device C to one of the attribute units D1 to Dk. That is, the attribute assignment unit 70 outputs attribute data outputted from each specialized device C to an attribute unit D corresponding to an attribute indicated by the attribute data (step S202).

Each attribute unit D receives the attribute data outputted from the attribute assignment unit 70 and performs a process corresponding to the attribute data. As a process corresponding to the attribute data, the attribute unit D according to the second embodiment generates a control signal corresponding to the attribute data and outputs the generated control signal to at least one actuator X. For example, the attribute unit D outputs, to an actuator X serving as light-emitting means, a control signal instructing the actuator X to emit light (step S203).

As seen above, in the assignment control apparatus 110 according to the second embodiment, the determination units B connected to the cameras A determine the categories of the image data, and the assignment unit 30 outputs the image data to the specialized devices C corresponding to the categories determined by the determination units B. Each specialized device C determines the attribute of the image data and outputs attribute data indicating the determined attribute to the attribute assignment unit 70. The attribute assignment unit 70 outputs each attribute data to an attribute unit D corresponding to the attribute data, and each attribute unit D performs a process corresponding to the attribute data. Thus, the assignment control apparatus 110 is able to distribute the load to the determination units B, specialized devices C, and attribute units D and thus to reduce the load on each processor and allows the image data to be smoothly used for a variety of applications. That is, the specialized devices C according to the second embodiment only have to perform image analysis on the image data of the categories in which the specialized devices C specialize and are able to leave the issuance of instructions to the actuators X to the attribute units D. Since the throughput of the specialized devices C is further reduced and the load is further distributed, the assignment control apparatus 10 is able to further speed up the entire process.

Each attribute unit D receives attribute data from the attribute assignment unit 70 and outputs a control signal corresponding to the attribute data to at least one of the actuators X controlled by the attribute unit D, and the actuator(s) X performs an operation corresponding to the control signal. Thus, the assignment control apparatus 110 allows the actuators X corresponding to the attributes of the image data to operate quickly.

The assignment control system 200 according to the second embodiment includes the assignment control apparatus 110 and the actuators X controlled by the assignment control apparatus 110. Each attribute unit D receives attribute data outputted from the attribute assignment unit 70 and outputs a control signal corresponding to the attribute data to at least one actuator X, and the actuator(s) X performs an operation corresponding to the control signal. Thus, the assignment control system 200 allows the actuators X corresponding to the attributes of the image data to operate quickly. The alternative configuration and the configuration of the modification 1-2 described in the first embodiment can also be applied to the assignment control apparatus 110 and assignment control system 200 according to the second embodiment. Other advantageous effects are similar to those of the first embodiment.

<Modification 2-1>

Figure 21:
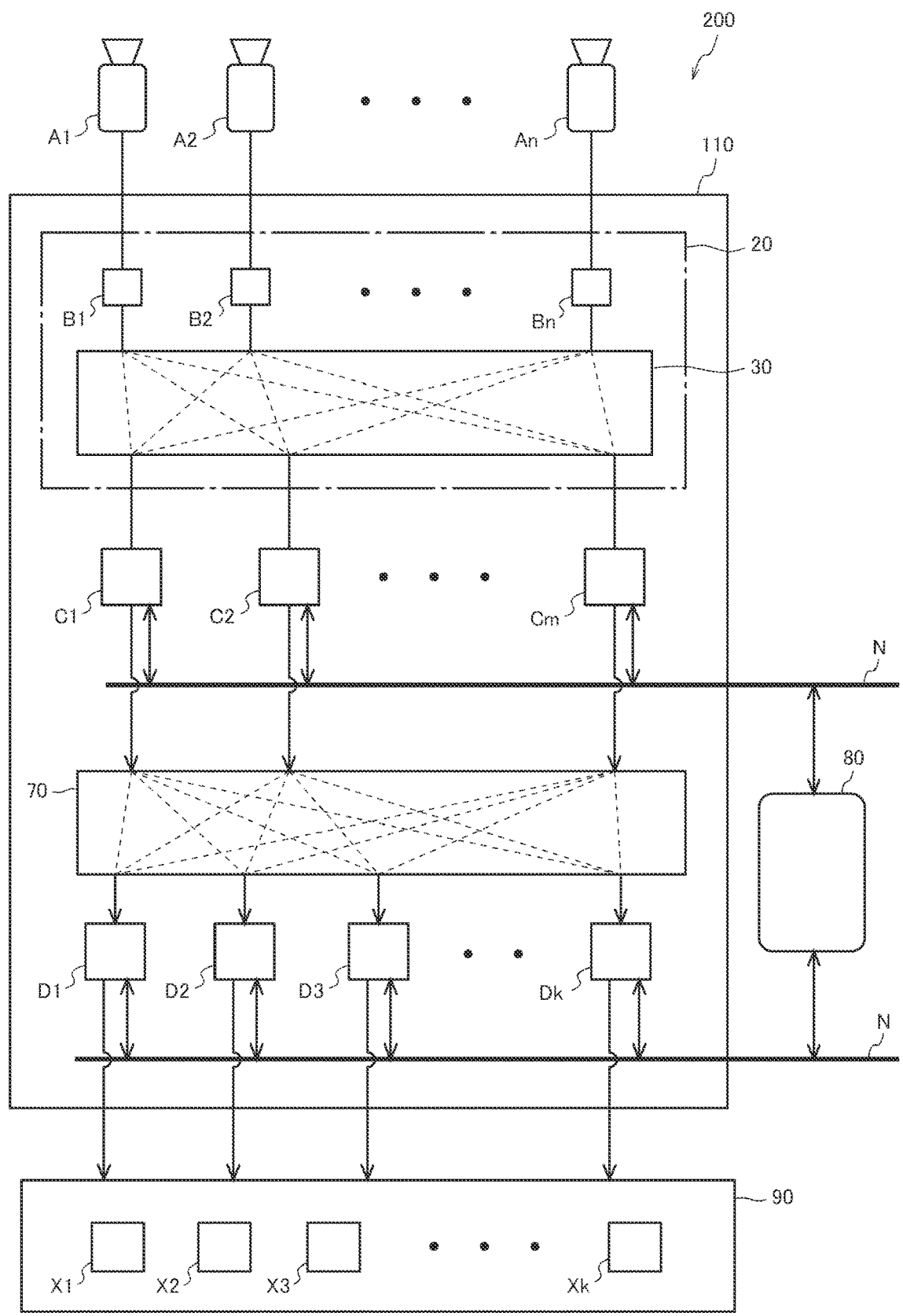
FIG. 21 is a block diagram showing an example configuration of an assignment control apparatus and assignment control system according to a modification 2-1 of the second embodiment of the present invention.

Next, referring to FIG. 21, an example configuration of an assignment control apparatus and assignment control system according to a modification 2-1 will be described. Each specialized device C according to the modification 2-1 outputs image data whose attribute has been determined to an attribute assignment unit 70 along with attribute data indicating the determined attribute. The attribute assignment unit 70 according to the modification 2-1 receives the attribute data and image data from the specialized device C and assigns the image data to an attribute unit D corresponding to the attribute indicated by the attribute data. That is, the attribute assignment unit 70 outputs image data outputted from each specialized device C to an attribute unit D corresponding to an attribute indicated by attribute data outputted along with the image data.

The attribute units D according to the modification 2-1 have performance similar to that of the specialized devices C and include functional components similar to those of the specialized devices C shown in FIG. 2. Each attribute unit D has a function of performing image analysis specializing in one of multiple attributes of a particular category. Specifically, each attribute unit D includes AI based on learning such as deep learning and classifies the attribute in more detail by extracting the feature value of a main object included in image data. Each attribute unit D receives image data from the attribute assignment unit 70, extracts the feature value by analyzing the image data, then generates a control signal corresponding to the extracted feature value, and outputs the generated control signal to at least one actuator X.

An update processor 80 according to the modification 2-1 is storing the control programs of the attribute units D. The update processor 80 updates the control programs by performing learning on the basis of image data, analysis results, and the like transmitted from the attribute units D and transmits the updated control programs to the attribute units D at a preset timing. Thus, the attribute units D are able to update the control programs.

The attribute assignment unit 70 may output attribute data along with image data to each attribute unit D, and the attribute unit D may use the attribute data to extract the feature value.

As described above, in the assignment control apparatus 110 according to the modification 2-1, the attribute units D have the image analysis function. Thus, each attribute unit D is able to issue a more detailed instruction corresponding to the feature value extracted from image data to at least one actuator X and thus to cause the actuator unit 90 to perform a more meaningful operation. The update processor 80 is able to use the analysis results obtained by the specialized devices C and the analysis results obtained by the attribute units D to update the control programs of the specialized devices C and attribute units D. Thus, the update processor 80 is able to update the control programs of the specialized devices C and attribute units D more accurately and more efficiently.

<Modification 2-2>

Next, referring to FIG. 22, an example configuration of an assignment control apparatus and assignment control system according to a modification 2-2 will be described. That is, while FIGS. 18, 19, and 21 show the assignment control apparatus 110 in which the components are implemented on the single substrate or the assignment control apparatus 110 consisting of one chip, these configurations are not limiting.

The assignment control apparatus 10 according to the modification 2-2 has a configuration in which components are implemented on two substates or a configuration consisting of two chips. More specifically, the assignment control apparatus 110 includes a first controller 110A including an assignment device 20 and multiple specialized devices C1 to Cm and a second controller 110B including an attribute assignment unit 70 and multiple attribute units D1 to Dk.

As seen above, the assignment control apparatus 10 according to the modification 2-2 consists of the two parts, the first controller 110A and second controller 110B. This increases the flexibility of arrangement and facilitates maintenance and management and thus improves user convenience. Note that the configuration of the modification 2-1 may be applied to the second controller 110B.

Third Embodiment

Figure 23:
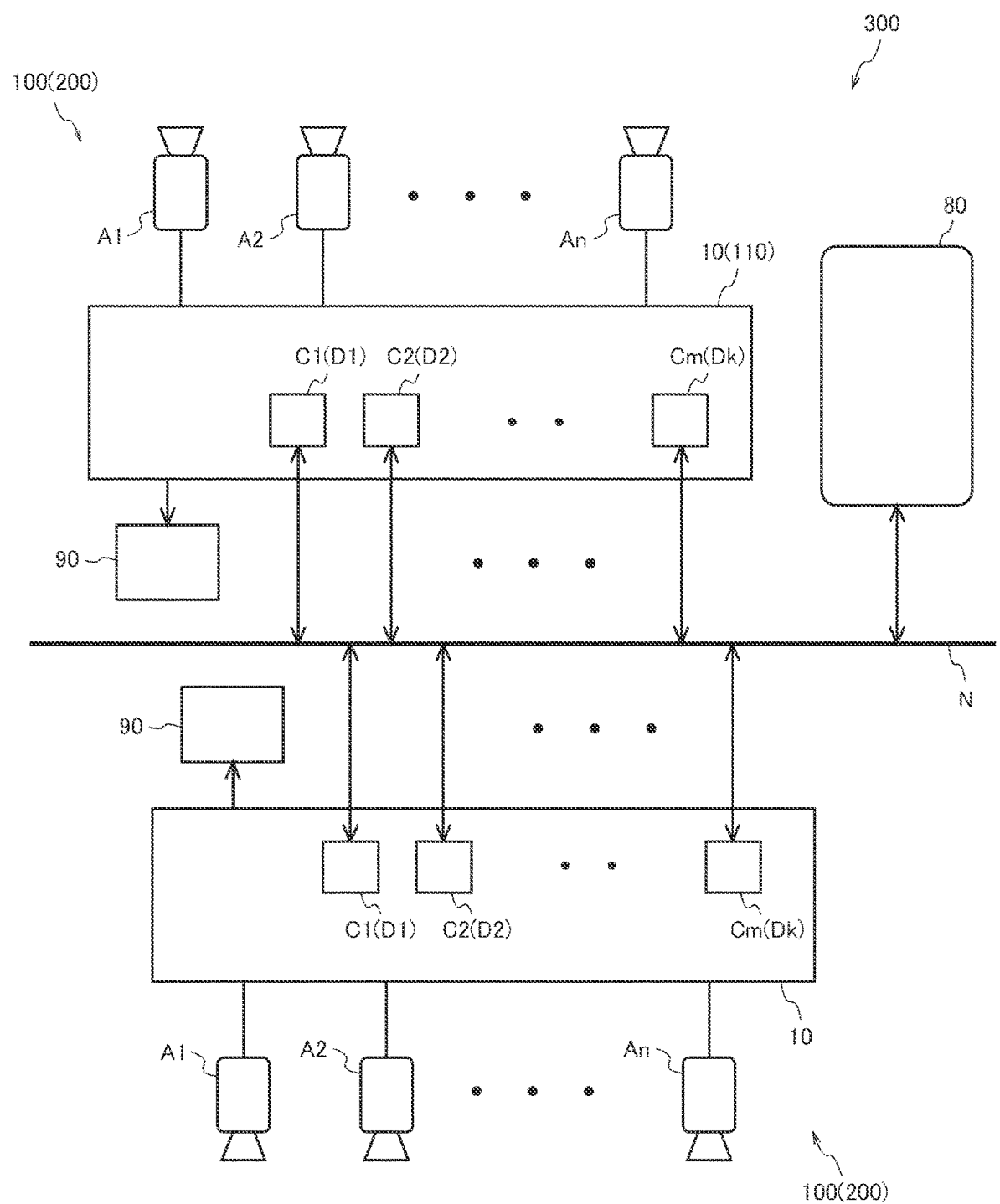
FIG. 23 is a block diagram showing an example configuration of an assignment control system according to a third embodiment of the present invention.

Referring to FIG. 23, an example configuration of an assignment control system according to a third embodiment of the present invention will be described. An assignment control system 300 according to the third embodiment may have a configuration in which multiple assignment control apparatuses 10 or multiple assignment control apparatuses 110 are included or a configuration in which an assignment control apparatus 10 and assignment control apparatus 110 are combined. In an example configuration shown in FIG. 23, the assignment control system 300 includes two assignment control apparatuses 10 or two assignment control apparatuses 110, or an assignment control apparatus 10 and an assignment control apparatus 110. Hereafter, the assignment control apparatus 10 and assignment control apparatus 110 are collectively referred to as the "assignment control apparatuses" without reference signs.

In the assignment control apparatuses included in the assignment control system 300, specialized devices C are connected to an update processor 80 through a network N. In the assignment control apparatus 110 according to the modification 2-1, the attribute units D are also connected to the update processor 80 through the network N. On the other hand, in the assignment control system 300, image data outputted from the multiple assignment control devices and analysis results obtained by the specialized devices C and the like are collected in the update processor 80.

The update processor 80 according to the third embodiment analyzes image data received from the assignment control apparatuses and reflects the analysis results on the update of the control programs of the specialized devices C or attribute units D. That is, the update processor 80 updates the analysis programs 432 of the specialized devices C of each assignment control apparatus on the basis of the image data and analysis information transmitted from the specialized devices C and transmits the updated analysis programs 432 to the assignment control apparatus. In the configuration of FIG. 21, the update processor 80 updates the analysis programs of the attribute units D of each assignment control apparatus on the basis of the image data and analysis result information transmitted from the attribute units D and transmits the updated analysis processor programs to the assignment control apparatus.

As seen above, in the assignment control system 300, the update processor 80 analyzes a larger amount of image data than in the configuration in which the single assignment control apparatus is included. Thus, the update processor 80 is able to update the control programs more accurately and thus to update the control programs of the specialized devices C or attribute units D more efficiently. Also, in the assignment control system 300, the multiple assignment control apparatuses are connected to the update processor 80 through the network N. Thus, for example, even if the assignment control apparatuses are installed in greatly different locations, image data, the analysis results of the image data, and the like from the assignment control apparatuses can be collected and used in the update processor 80.

While the example in which the assignment control system 300 includes the actuator unit 90 is shown in FIG. 23, this example is not limiting and the actuator unit 90 may be provided outside the assignment control system 300. Other configurations, alternative configurations, or the like are similar to those of the first and second embodiments, and other advantageous effects are also similar to those of the first and second embodiments.

The above embodiments are preferred specific examples of the assignment control apparatus and assignment control system, and the technical scope of the present invention is not limited to these aspects. For example, while the actuators Xb1 to Xb4 have been described as being able to output not only a sound or voice but also ultrasound in accordance with control signals from the specialized devices C with reference to FIGS. 4 and 5, those actuators X may be configured otherwise. For example, the actuator unit 90 may include different actuators X such as one or more actuators X specializing in outputting a sound, one or more actuators X specializing in outputting a voice, and one or more actuators X specializing in outputting ultrasound.

While the actuators Xa1 to Xa4 have been described as being homogeneous light-emitting means with reference to FIGS. 4 and 5, those actuators X may be configured otherwise. For example, the actuator unit 90 may include different actuators X such as one or more actuators X including a light source such as an LED and one or more actuators X including a stroboscope.

While the drone including the six motors M and six propellers P is shown as an example of the flying object 500 in FIGS. 4 and 5, this drone is not limiting. The flying object 500 may be a drone including five or less or seven or more motors M and propellers P. The number and arrangement of the actuators X, the connection relationships between the specialized devices C and actuators X, or the like are not limited to those in FIGS. 4 and 5 and may be changed as appropriate. The flying object 500 may be an airplane, helicopter, airship, balloon, or the like.

Figure 22:
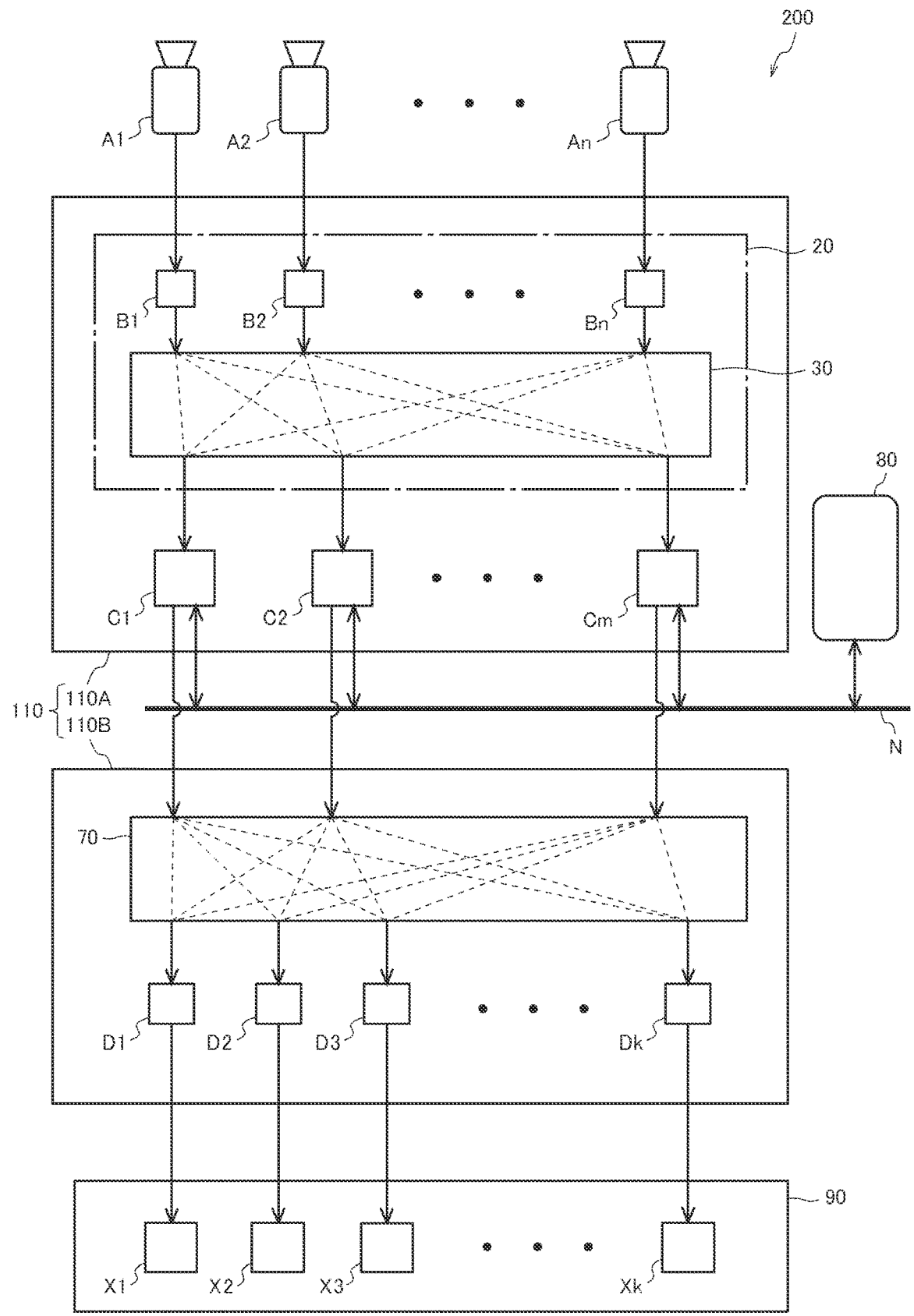
FIG. 22 is a block diagram showing an example configuration of an assignment control apparatus and assignment control system according to a modification 2-2 of the second embodiment of the present invention.

While the examples in which the attribute units D and actuators X are associated with each other one-to-one are shown in FIGS. 18, 19, and 22, these examples are not limiting and each attribute unit D may be configured to output control signals to multiple actuators X. Thus, the actuator unit 90 is able to make outputs in more various ways in accordance with the attribute of image data. For example, it is able to combine notification using a sound or voice and light emission.

The update processor 80 may acquire category data from each specialized device C and replace the control program of a specialized device C corresponding to a category having a low occurrence frequency with the control program of a specialized device C corresponding to a category having a high occurrence frequency in accordance with the frequency of occurrence of category, or the like. Thus, for example, if the cameras A connected to the assignment control apparatus are installed in a location in which many birds are present, the number of specialized devices C corresponding to the category "bird" can be increased later. Also, if objects included in image data vary depending on the day of week, time zone, or the like, multiple specialized devices C can be properly combined when necessary.

While, in the above embodiments, the one or more cameras A have been described as examples of devices that output data to the assignment control apparatus, the one or more cameras A are not limiting and various types of sensing devices may be connected to the assignment control apparatus as data output source devices. In this case, the assignment control apparatus is preferably configured to include one or more controllers that perform arithmetic operation or the like using sensing data outputted from the sensing devices. Each controller consists of, for example, a CPU or GPU. That is, the assignment control apparatus controls the operation of one or more actuators X using image data and sensing data. Also, the assignment control apparatus may be configured to control the operation of one or more actuators X in cooperation with an external device to which the sensing devices are connected. The external device is a device that performs arithmetic operation or the like using sensing data outputted from the sensing devices.

The assignment control apparatus may be applied to, for example, an automobile autonomous driving system. In this case, the cameras A are installed so as to capture images of the inside or outside of an automobile. Thus, the cameras A output image data including information on traffic signs, traffic signals, white lines on the road surface, vehicles in front or in rear, oncoming vehicles, motorcycles, bicycles, pedestrians, and the like to the assignment control apparatus. The assignment control apparatus controls the operation of various types of actuators X included in the automobile on the basis of the image data outputted from the cameras A. Sensing devices such as millimeter wave radars or LiDAR (light detection and ranging) devices may be connected to the assignment control apparatus as data output source devices, and the assignment control apparatus may perform arithmetic operation or the like using sensing data from these sensing devices. In this case, the assignment control apparatus controls the operation of various types of actuators X included in the automobile using image data and sensing data. The assignment control apparatus may control the operation of various types of actuators X included in the automobile in cooperation with an external device to which sensing devices such as millimeter wave radars or LiDAR devices are connected. The assignment control apparatus may be configured to be able to perform a process using a global positioning system (GPS), or may control the operation of various types of actuators X included in the automobile in cooperation with an external device that performs a process using a GPS.

The determination units B included in the assignment control apparatus may be formed of a single chip as, for example, an SoC. In the assignment control apparatus, the assignment device 20 may be formed of a single chip, or the specialized devices C may be formed of a single chip. Also, the entire assignment control apparatus may be formed of a single chip. In the example configurations of the assignment control apparatus in FIGS. 18, 19, 21, and 22, the attribute units D may be formed of a single chip, or a combination of the attribute assignment unit 70 and attribute units D may be formed of a single chip. The controller of each determination unit B may be formed as an SoC including CPU, GPU, or the like. The determination units B may be incorporated in the cameras A. While, in the above embodiments, examples of the names of categories and attributes are placed in quotation marks, these descriptions are for the sake of convenience and these examples are not limiting. The speeches for calling attention can also be properly changed as necessary.

REFERENCE SIGNS LIST

10, 110: assignment control apparatus, 20: assignment device, 30: assignment unit, 41: first communication unit, 42: second communication unit, 43: storage unit, 43*a*: memory means, 43*b*: storage means, 431: learning program, 432: analysis program, 433: update program, 44: controller, 44*a*: learning means, 44*b*: analysis means, 44*c*: update means, 50: central update unit, 70: attribute assignment unit, 80: update processor, 90: actuator unit, 90*a*: display unit, 90*b*: display, 95: display control device, 96: selector, 97: selection unit, 98: display unit, 99: display device, 100, 200, 300: assignment control system, 110A: first controller, 110B: second controller, 150A, 150B: monitoring/warning unit, 151: housing, 151*a*: first housing, 151*b*: second housing, 152: leg, 160A, 160B, 161, 161A, 161B: traffic signal, 400: image display system, 500: flying object, 510: body, 600: traffic signal controller, A, A1 to An: camera, B, B1 to Bn: determination unit, C, C1 to Cm: specialized device, D, D1 to Dk: attribute unit, M: motor, N: network, P: propeller, X, X1 to Xk, Xa1 to Xa4, Xb1 to Xb4: actuator, X7*a*, X7*b*, X8*a*, X9*a*: display board, Y, Y1 to Y6: analysis processor

The invention claimed is:

1. An assignment control apparatus comprising:
    an assignment device connected to a plurality of cameras; and
    a plurality of specialized devices connected to the assignment device wherein each specialized device of the plurality of specialized devices respectively corresponds to one category of a plurality of preset categories,
    wherein the assignment device comprises:
        a plurality of determination units connected to the plurality of cameras one-to-one, wherein each determination unit of the plurality of determination units is respectively configured to determine a category of image data received from the camera to which the determination unit is connected, the category being one of the plurality of preset categories, and output the image data along with category data indicating the determined category; and
        an assignment unit configured to select, based upon the category data outputted from one of the plurality of determination units, one of the plurality of specialized devices as a selected device, and output the image data outputted along with the category data from the one of the plurality of determination units to the selected device,
    wherein the entire assignment control apparatus is formed of a single chip,
    wherein the assignment unit is a field-programmable gate array (FPGA),
    wherein the assignment control apparatus further comprises:
        an attribute assignment unit connected to the plurality of specialized devices; and
        a plurality of attribute units connected to the attribute assignment unit, wherein each attribute unit of the plurality of attribute units respectively corresponds to one attribute of a plurality of attributes,
    wherein each specialized device of the plurality of specialized devices is configured to:
        determine an attribute of the image data outputted from the assignment unit, and
        output attribute data indicating the determined attribute to the attribute assignment unit,
    wherein the attribute assignment unit is configured to output the attribute data outputted from each specialized device of the plurality of specialized devices to the attribute unit corresponding to the attribute indicated by the attribute data,
    wherein each attribute unit of the plurality of attribute units is configured to perform a process corresponding to the attribute data outputted from the attribute assignment unit,
    wherein each specialized device of the plurality of specialized devices is configured to:

respectively output the image data whose attribute has been determined to the attribute assignment unit along with the attribute data indicating the determined attribute, wherein the attribute assignment unit is configured to:

output the image data that has been outputted from each specialized device of the plurality of specialized devices and whose attribute has been determined to the attribute unit corresponding to the attribute indicated by the attribute data outputted along with the image data, and wherein each attribute unit of the plurality of attribute units is configured to:

extract a feature value from the image data outputted from the attribute assignment unit by analyzing the image data, and output a control signal corresponding to the extracted feature value to an actuator controlled by the respective attribute unit.

2. An assignment control system comprising:

a plurality of assignment control apparatuses of claim 1;

wherein each specialized device of the plurality of specialized devices is configured to:

determine the attribute of the image data outputted from the assignment unit, the attribute being one of the plurality of attributes, and perform a process corresponding to the determined attribute, and an update device, wherein each specialized device of the plurality of specialized devices of each assignment control apparatus of the plurality of assignment control apparatuses has an analysis program related to determination of the attribute and is configured to transmit the image data and analysis information including the determined attribute to the update device, and wherein the update device is configured to:

update the analysis programs of the plurality of specialized devices of each assignment control apparatus of the plurality of assignment control apparatuses based on the image data and the analysis information transmitted from the plurality of specialized devices of each assignment control apparatus of the plurality of assignment control apparatuses, and transmit the updated analysis programs to the plurality of assignment control apparatuses.

* * * * *